United States Patent
Petersen

(10) Patent No.: US 9,559,589 B2
(45) Date of Patent: Jan. 31, 2017

(54) HIGH EFFICIENCY SWITCHING BOOST CONVERTER WITH REDUCED INDUCTOR CURRENT RIPPLE

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 14/965,981

(22) Filed: Dec. 11, 2015

(65) Prior Publication Data

US 2017/0005576 A1 Jan. 5, 2017

(30) Foreign Application Priority Data

Jul. 1, 2015 (DE) .................. 10 2015 212 331

(51) Int. Cl.
| | |
|---|---|
| *H05B 41/28* | (2006.01) |
| *H02M 3/158* | (2006.01) |
| *H05B 33/08* | (2006.01) |

(52) U.S. Cl.
CPC ........... *H02M 3/158* (2013.01); *H05B 33/083* (2013.01); *H05B 33/0815* (2013.01)

(58) Field of Classification Search
CPC .... H04L 49/15; H01L 27/088; H05B 33/0824; H05B 33/0827; H05B 33/083; H05B 33/0896

(Continued)

(56) References Cited

U.S. PATENT DOCUMENTS

| | | | |
|---|---|---|---|
| 5,581,454 | A | 12/1996 | Collins |
| 5,606,491 | A | 2/1997 | Ellis |

(Continued)

FOREIGN PATENT DOCUMENTS

| | | |
|---|---|---|
| DE | 102006060011 | 7/2008 |
| WO | WO2014007806 | 1/2014 |
| WO | WO2014154390 | 10/2014 |

OTHER PUBLICATIONS

German Office Action, Jan. 26, 2016, Dialog Semiconductor (UK) Limited, 10 2015 212 331.6.

(Continued)

*Primary Examiner* — Tuyet Vo
(74) *Attorney, Agent, or Firm* — Saile Ackerman LLC; Stephen B. Ackerman

(57) ABSTRACT

A voltage or current regulated power converter is presented. The power converter is configured to derive electrical power at an output voltage $V_{out}$ at an output of the power converter from electrical power at an input voltage $V_{in}$ at an input of the power converter, wherein the output voltage $V_{out}$ is greater than or equal to the input voltage $V_{in}$. The power converter comprises an inductor, a plurality of capacitors and a plurality of switches. The input and output unit are coupled via an intermediate point, wherein the output unit comprises a first output or second output arrangement, and wherein the input unit comprises a first input or a second input arrangement. The power converter comprises a controller configured to control the plurality of switches such that a commutation cycle of the power converter comprises a plurality of different operation phases.

17 Claims, 22 Drawing Sheets

(58) Field of Classification Search
USPC .......... 315/185 S, 247, 291, 209 R, 307–326
See application file for complete search history.

(56) References Cited

U.S. PATENT DOCUMENTS

| | | | |
|---|---|---|---|
| 7,696,735 | B2 | 4/2010 | Oraw et al. |
| 7,746,041 | B2 | 6/2010 | Xu et al. |
| 8,330,436 | B2 | 12/2012 | Oraw et al. |
| 8,519,788 | B2 | 8/2013 | Khlat |
| 8,582,333 | B2 | 11/2013 | Oraw et al. |
| 8,618,868 | B2 | 12/2013 | Khlat et al. |
| 2004/0041620 | A1 | 3/2004 | D'Angelo et al. |
| 2005/0174098 | A1 | 8/2005 | Watanabe et al. |
| 2008/0031023 | A1* | 2/2008 | Kitagawa ................ H02M 3/07 363/59 |
| 2008/0157732 | A1 | 7/2008 | Williams |
| 2008/0211316 | A1 | 9/2008 | Watanabe et al. |
| 2011/0254514 | A1 | 10/2011 | Fleming |
| 2014/0184189 | A1 | 7/2014 | Salem |
| 2015/0015088 | A1 | 1/2015 | Petersen |

OTHER PUBLICATIONS

"Charge Pump Circuits: An Overview on Design Strategies and Topologies," by Gaetano Palumbo et al, IEEE Circuits and Systems Magazine, First Quarter 2010, pp. 31-45.

"On-Chip High-Voltage Generation in MNOS Integrated Circuits Using an Improved Voltage Multiplier Technique," by John F. Dickson, IEEE Journal of Solid-State Circuits, vol. SC-11, No. 3, Jun. 1976, pp. 374-378.

"Merged Two-Stage Power Converter Architecture with Soft Charging Switched-Capacitor Energy Transfer," by Robert C.N. Pilawa-Podgurski, et al., Power Electronics Specialists Conference, PESC, IEEE, Jun. 2008, pp. 4008-4015.

"A Hybrid Switched-Capacitor/Inductor Converter for Small Conversion Ratios," by Norah Elena Nakibuuka, B.S. Massachusetts Institute of Technology Masters Thesis, May 24, 2013, 69 pgs.

"Step-Up Switching-Mode Converter With High Voltage Gain Using a Switched-Capacitor Circuit," by IEEE Transactions on Circuits and Systems—I: Fundamental Theory and Applications, vol. 50, No. 8, Aug. 2003, pp. 1098-1102.

"Design of a Two-Level Boost Converter," by Ronald Y. Barazarte et al., 11th Latin American and Caribbean Conference for Engineering and Technology, Cancun, Mexico, Aug. 14-16, 2013, pp. 1-10.

"Single-Phase Three-Level Boost Power Factor Correction Converter," by Michael T. Zhang et al., Applied Power Electronics Conference and Exposition, 1995. APEC '95. Conference Proceedings 1995., Tenth Annual, Mar. 1995, pp. 434-439.

"Multi-Level Conversion: High Voltage Choppers and Voltage-Source Inverters," by T.A. Meynard et al., Power Electronics Specialists Conference, 1992. PESC '92 Record., 23rd Annual IEEE, Jun. 29-Jul. 3, 1992, pp. 397-403.

"A New Approach to Low Ripple-Noise Switching Converters on the Basis of Switched-Capacitor Converters" by Tohru Umeno et al., IEEE International Sympoisum on Circuits and Systems, Jun. 1991, pp. 1077-1080.

\* cited by examiner

HIGH EFFICIENCY SWITCHING BOOST CONVERTER WITH REDUCED INDUCTOR CURRENT RIPPLE

TECHNICAL FIELD

The present document relates to power converters with regulated output voltage or output current. In particular, the present document relates to switched power converters for LED backlight applications.

BACKGROUND

The efficiency of a conventional switched power converter, such as a buck converter, is dominated by the losses within the switches (e.g. field effect transistors, FETs) and the inductor of the power converter. If the power converter provides a relatively high output voltage $V_{out}$, the power converter typically exhibits a reduced conversion efficiency, because the switches must be implemented in high voltage technology, and thus the switches have an increased switch area and increased reverse recovery losses. Relatively large FETs typically cause relatively high switching losses, because of an increased gate charge and LX capacitance.

The voltage which is applied to the inductor of a boost converter is proportional to the difference between the input voltage $V_{in}$ and the output voltage $V_{out}$, i.e. $V_{in}-V_{out}$, during the magnetization phase, or proportional to $V_{out}$ during the demagnetization phase. Increased inductor voltages cause increased current variations dI/dt and thus an increased switching frequency (for achieving a pre-determined current ripple) and/or an increased current ripple (for a given switching frequency). In both cases this leads to increased inductor core losses and to an increased dissipation power.

Maintaining low current variations $dI_L/dt$ at increased input and output voltages typically requires inductors (i.e. coils) with increased inductance L, due to the relation $dI_L/dt=V_L/L$. However, coils with an increased inductance L have an increased number of turns. For inductors to maintain their Direct Current Resistance (DCR) even with an increased number of turns, each turn has to make use of a wire with an increased thickness to compensate for the impedance increase. Thus the size of the inductor is growing twice with an increased inductance L (due to the increased number of turns and due to the increased wire thickness). On the other hand, if the inductor dimensions are not increased, an increased inductance L leads to the effect that the DCR of the inductor is growing twice due to the additional number of turns and due to the use of a thinner wire.

Over the last years battery powered applications such as smartphones and tablets exhibit increased LCD resolution and size, therefore demanding for LED backlight with higher brightness and size. As a result of this development, the power which is required for LED backlight has increased, despite the fact that LEDs have improved efficiency. As LED brightness is proportional to its current, a uniform LED backlight brightness may be achieved by connecting multiple LEDs in series (typically 6-7 LEDs). A boost converter may be used to drive such LED strings, because the typical supply voltage for such LED strings (16-20V) is substantially higher than the output voltage of a LiIon battery pack (~3.7V).

As backlight power is required most of the time for an active application, the boost converter efficiency contributes significantly to the overall mobility time of a portable application. Smartphones are space and height constrained (especially regarding the inductors used for switching converters). Consequently, the boost converter cannot use coils of high inductance L. As a result, either the DCR of the coil or the switching frequency may need to be increased. Both measures lead to reduced efficiency.

SUMMARY

The present document is particularly directed to the voltage step-up conversion for a LED backlight driver. It should be noted, however, that the principles which are described in the present document are applicable in general to all applications that require DC/DC step-up conversion at high efficiency, especially if, because of space constraints, low switching frequencies cannot be achieved through high inductance coils (like e.g. for the boost converter of a boosted class D audio amplifier).

The present document addresses the technical problem of providing a power efficient and compact step-up power converter. In particular, the present document is directed at increasing LED backlight step-up conversion efficiency to greater than 93%, in order to increase battery mobility time. At the same time, the power converter should exhibit a reduced bill of material (BOM) and operate within the space constraints of a given target application. As such, the power converter should enable the use of relatively small inductors.

According to an aspect, a voltage or current regulated power converter is described. The power converter is configured to derive electrical power at an output voltage $V_{out}$ at an output of the power converter from electrical power at an input voltage $V_{in}$ at an input of the power converter. In particular, the power converter is configured to derive electrical power at an output voltage such that the output voltage $V_{out}$ is greater than or equal to the input voltage $V_{in}$. The output voltage may be used e.g. to supply a serial arrangement of a plurality of solid state lighting (SSL) devices (such as light emitting diodes, LED). The power at the input of the power converter may be provided by a battery of an electronic device.

The power converter comprises an inductor, a plurality of capacitors and a plurality of switches. A switch of the plurality of switches may comprise a metaloxide semiconductor (MOS) transistor, e.g. a MOS field effect transistor (MOSFET). The above mentioned components of the power converter may be arranged within or may form an input unit and an output unit of the power converter. The input unit and the output unit may be (directly) coupled to one another via an intermediate point. The input unit may be (directly) coupled to the input of the power converter and the output unit may be (directly) coupled to the output of the power converter. As such, the input unit and the output unit may together form the power converter. The output unit comprises (either) a first output arrangement or a second output arrangement. Furthermore, the input unit comprises (either) a first input arrangement or a second input arrangement.

Furthermore, the power converter comprises a controller configured to control the plurality of switches such that a commutation cycle of the power converter comprises a plurality or a sequence of different operation phases. The different operation phases may comprise different configurations of the inductor and the plurality of capacitors of the power converter. These different configurations may be achieved by different settings (closed or open) of one or more switches of the plurality of switches. The sequence of operation phases may be such that during a commutation cycle power is transferred from the input of the power converter to the output of the power converter.

The controller may be configured to set the duration for each of the plurality of operation phases such that the output voltage is regulated to a pre-determined reference voltage or such that the output current at the output of the power converter is regulated to a pre-determined reference current. The sum of the durations of a sequence of operation phases of a commutation cycle corresponds to the duration of the commutation cycle, and thereby defines the operation frequency of the power converter.

The pre-determined reference voltage may be an integer multiple of the input voltage, wherein the integer multiple typically depends on the number of capacitors of the power converter. By operating the power converter with a conversion ratio that is an integer, optimum efficiency may be achieved.

The first output arrangement may comprise a second capacitor C2 and a third capacitor C3 which are arranged in series. The serial arrangement of the second capacitor C2 and the third capacitor C3 may be arranged in parallel to a positive contact and a negative contact of the output of the power converter. The first output arrangement further comprises a switch S5 (referred to as the fifth switch of the plurality of switches) which is configured to (directly) couple the intermediate point to the positive contact of the output of the power converter. Furthermore, the first output arrangement comprises a switch S4 (referred to as the fourth switch of the plurality of switches) which is configured to (directly) couple the intermediate point to a midpoint between the second capacitor and the third capacitor. In addition, the first output arrangement comprises a switch S7 (referred to as the seventh switch of the plurality of switches) which is configured to (directly) couple the midpoint between the second capacitor and the third capacitor to ground. The first output arrangement further comprises a switch S6 (referred to as the sixth switch of the plurality of switches) which is configured to (directly) couple the negative contact of the output of the power converter to ground. As such, the first output arrangement may provide an output voltage which may exhibit a varying reference potential (different from ground).

The second output arrangement may comprise an output capacitor $C_{out}$ which is arranged in parallel between a positive contact and a negative contact of the output of the power converter. Furthermore, the second output arrangement may comprise a second capacitor C2. The second output arrangement comprises a switch S6 (referred to as the sixth switch of the plurality of switches) which is configured to (directly) couple a positive contact of the output of the power converter to a first end of the second capacitor C2. Furthermore, the second output arrangement comprises a switch S7 (referred to as the seventh switch of the plurality of switches) which is configured to (directly) couple a second end of the second capacitor C2 to ground. Within the second output arrangement a negative contact of the output of the power converter may be (constantly) coupled to ground. As such, the second output arrangement may provide an output voltage which exhibits a fixed reference potential (i.e. ground).

The second output arrangement further comprises a switch S5 (referred to as the fifth switch of the plurality of switches) which is configured to (directly) couple the intermediate point to the first end of the second capacitor. Furthermore, the second output arrangement comprises a switch S4 (referred to as the fourth switch of the plurality of switches) which is configured to (directly) couple the intermediate point to the second end of the second capacitor.

On the other hand, the first input arrangement may comprise a first capacitor C1 and the inductor L. In addition, the first input arrangement comprises a switch S1 (referred to as the first switch of the plurality of switches) which is configured to (directly) couple a second end of the inductor to the intermediate point. A first end of the inductor is (directly) coupled to a positive contact of the input of the power converter and a first end of the first capacitor is (directly) coupled to the intermediate point. By placing the inductor directly at the input of the power converter, the conversion ratio of the power converter may be increased (e.g. maximized).

The first input arrangement further comprises a switch S2 (referred to as the second switch of the plurality of switches) which is configured to (directly) couple the second end of the inductor to the second end of the first capacitor. Furthermore, the first input arrangement comprises a switch S3 (referred to as the third switch of the plurality of switches) which is configured to (directly) couple a second end of the first capacitor to ground. A negative contact of the input of the power converter may be (directly) coupled to ground.

The second input arrangement may comprise a first capacitor C1 and the inductor L. The second input arrangement further comprises a switch S1 (referred to as the first switch of the plurality of switches) which is configured to (directly) couple a first end of the inductor to a positive contact of the input of the power converter. A second end of the inductor is (directly) coupled to the intermediate point and a first end of the first capacitor is (directly) coupled to a first end of the inductor. As such, the inductor may be arranged between the first capacitor and the intermediate point. By doing this, optimum efficiency at reduced conversion ratios may be provided.

Furthermore, the second input arrangement comprises a switch S2 (referred to as the second switch of the plurality of switches) which is configured to (directly) couple the second end of the first capacitor to the positive contact of the input of the power converter. In addition, the second input arrangement comprises a switch S3 (referred to as the third switch of the plurality of switches) which is configured to (directly) couple a second end of the first capacitor to ground. A negative contact of the input of the power converter may be (directly) coupled to ground.

The above mentioned power converter is configured to perform step-up conversion in a power efficient manner (notably for integer valued conversion ratios). Furthermore, the power converter comprises a relatively low number of components (notably switches and/or capacitors), and may be implemented with relatively low space requirements.

The sequence of operation phases which are used for the operation of the power converter are typically dependent on whether the input unit comprises the first input arrangement or the second input arrangement, and/or on whether the output unit comprises the first output arrangement or the second output arrangement.

The plurality or sequence of operation phases may comprise a first phase during which the inductor is arranged in parallel between the positive contact and the negative contact of the input. The first phase may be used to magnetize the inductor, thereby storing energy or power within the inductor. Furthermore, the plurality or sequence of operation phases may comprise a second phase during which a serial arrangement of the inductor and the first capacitor is arranged in parallel between the positive contact and the negative contact of the input. The second phase may be used to transfer energy or power from the inductor to the first capacitor, thereby charging the first capacitor (e.g. to $V_{in}$ or more).

The plurality or sequence of operation phases may comprise a third phase during which the one or more capacitors of the output unit are arranged in parallel or in series to a serial arrangement of the inductor and the first capacitor. By doing this, power may be transferred from the inductor and/or from the first capacitor to the one or more capacitors of the output unit (e.g. to the second or third capacitor and/or to the output capacitor). As such, power conversion may be achieved using a sequence of operation phases which comprise the first, second and third operation phase.

The orientation of the first capacitor may be such that during the second phase the first capacitor has an orientation with respect to the inductor, which is reversed compared to an orientation of the first capacitor during the third phase. By doing this, a conversion ratio of the power converter may be increased. In particular, the reversed orientation of the first capacitor may enable an output voltage which is 4 times higher than the input voltage.

The plurality of operation phases may comprise a fourth phase during which the one or more capacitors of the output unit are arranged in series (only) with the inductor. At the same time, the first capacitor may be decoupled from the input and the output of the power converter. By providing an operation phase which does not involve the first capacitor, fractional (i.e. non-integer) conversion ratios may be provided, while maintaining high efficiency of the power converter.

The sequence or plurality of operation phases may be such that prior to an (e.g. prior to each) operation phase during which the inductor is coupled to the output unit, the power converter is operated in an operation phase (e.g. in the first operation phase) during which the inductor is magnetized (or de-magnetized, depending on the ratio of Vout to Vin). By doing this, output voltage ripple may be reduced.

The sequence or plurality of operation phases may be such that prior to an (e.g. prior to each) operation phase during which the inductor is arranged in series to the first capacitor, the power converter is operated in an operation phase during which the inductor is magnetized (or de-magnetized, depending on the ratio of Vout to Vin). By doing this, output voltage ripple may be reduced.

The input unit may comprise a plurality of first input arrangements or a plurality of second input arrangements. The plurality of first input arrangements or the plurality of second input arrangements may be arranged in parallel to one another, e.g. in parallel between the input of the power converter and the intermediate node. The controller may be configured to operate the plurality of first and/or second input arrangements in an interleaved manner. By making use of a plurality of (parallel) input arrangements and by performing interleaved operation, the output voltage/output current ripple may be reduced.

The plurality of first input arrangements and/or the plurality of second input arrangements may each comprise only a joint single inductor. By doing this, the number of components and the cost/size of the power converter may be reduced.

The output unit may comprise the second output arrangement, wherein the second output arrangement further comprises a third capacitor and an eighth switch. The eighth switch may be configured to couple a first end of the third capacitor to the second end of the second capacitor. A second end of the third capacitor may be coupled to ground. The controller may be configured to operate the power converter in a phase during which the second capacitor and the third capacitor are arranged in series, and parallel to the output capacitor. During such a phase, power may be transferred from the second and third capacitor to the output capacitor and/or to the output of the power converter. Furthermore, the controller may be configured to operate the power converter in a phase during which the second capacitor and the third capacitor are arranged in parallel to one another and each in series to a serial arrangement of the inductor and the first capacitor. During such a phase, power may be transferred from the input unit towards the second and third capacitor. By making use of a third capacitor within the second output arrangement, the output voltage ripple may be reduced.

The input unit may comprise a plurality of second input arrangements. Furthermore, the output unit may comprise a plurality of second output arrangements. The controller may be configured to operate the plurality of second input arrangements and/or the plurality of second output arrangements in an interleaved manner. The provision of interleaved input/output arrangements may lead to reduced output voltage ripple.

According to another aspect, a method for operating a controller as outlined in the present document is described.

It should be noted that the methods and systems including its preferred embodiments as outlined in the present document may be used stand-alone or in combination with the other methods and systems disclosed in this document. In addition, the features outlined in the context of a system are also applicable to a corresponding method.

Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1A:
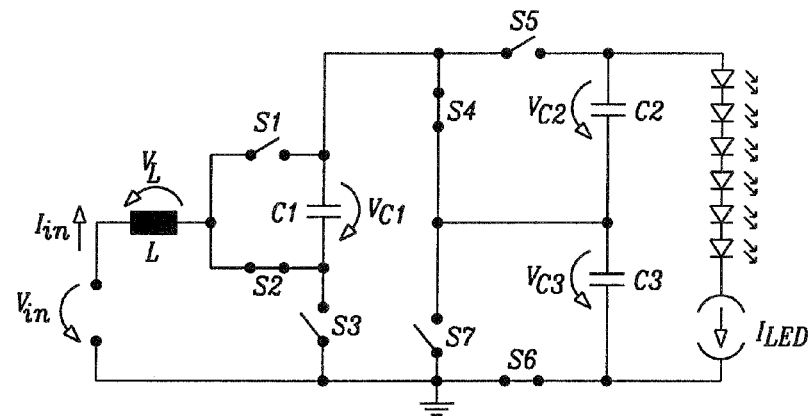
FIGS. 1, 1B, 1C, 1D, 1E, 1F, 1G, 1H illustrate example step-up power converters.

As outlined above, the present document is directed at providing a compact step-up power converter with increased conversion efficiency. The efficiency of a boost converter may be improved by using a Multi-Level Boost Converter.

Alternatively or in addition, step-up converters may be cascaded, but the efficiencies of cascaded stages are typically multiplied, which results in reduced overall efficiency (in addition to a cost and area overhead). The drawbacks of cascaded converters may be reduced by using unregulated switched capacitor voltage multiplication within at least one of the stages. This may be possible because capacitors are typically much smaller than inductors with similar energy storage capacity. The resulting conversion efficiency of a capacitive switching stage may be up to 98-99%.

A Multi-Level Boost Converter typically requires an increased number (e.g. two times) of switches compared to a standard Boost Converter. However, at least the bottom and mid switches of such a converter are not exposed to voltages higher than $V_{out}/2$, which enables the usage of FETs with reduced voltage ratings, thereby providing lower on-resistances $R_{dson}$ at similar parasitic capacitance and reduced reverse recovery loss. In the following, Multi-Level Boost Converters with a reduced number of switches are described.

FIG. 1 shows a block diagram of an example multi-level boost converter (in the context of an LED backlight scenario). The converter of FIG. 1 provides an optimum conversion efficiency at $D=V_{out}/V_{in}\sim4:1$. A similar optimum conversion efficiency may also be achieved for D=2:1 and D=1:1. The different possible operation phases of the converter of FIG. 1 are illustrated in FIGS. 3A to 3H. The converter of FIG. 1 enables high efficiency (greater than 93%) at the above mentioned conversion ratios. Furthermore, the converter of FIG. 1 requires a relatively low number of switches S1 to S7, as well as a relatively low number of capacitors C1, C2 and C3. In particular, the converter of FIG. 1 enables relatively low current ripple without using dedicated input and/or output capacitors, which are arranged in parallel to the input and/or the output of the power converter, respectively. As a matter of fact, the capacitors C2 and C3 jointly provide the function of an output capacitor of the power converter, while at the same time being involved in power conversion operations. A further benefit of the converter of FIG. 1 is that the converter never connects capacitors in parallel and by that avoids inrush currents and loss from non-adiabatic charge redistribution.

The converter of FIG. 1 may be divided into an input unit and an output unit, wherein the input unit and the output unit are coupled at an intermediate point which corresponds to the midpoint between the switches S1 and S5.

The converter of FIG. 1 may be operated using the operation phases shown in FIGS. 3A to 3H. In particular, at least some of the operation phases may be cycled from the phase of FIG. 3A to the phase of 3H and back to the phase of FIG. 3A (during a particular commutation cycle).

Figure 3A:
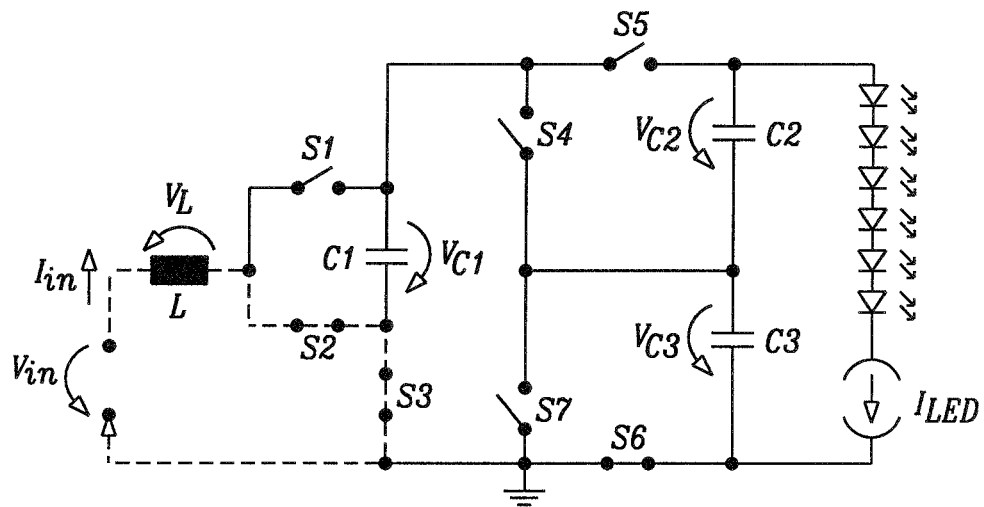
FIGS. 3A to 3J show example operation phases of the power converter of FIG. 1.
Figure 3B:
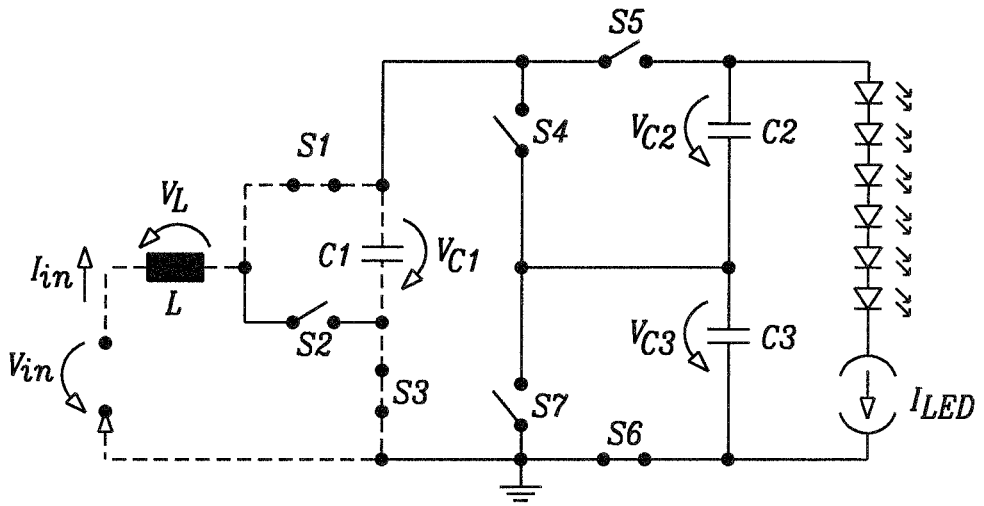
Figure 3C:
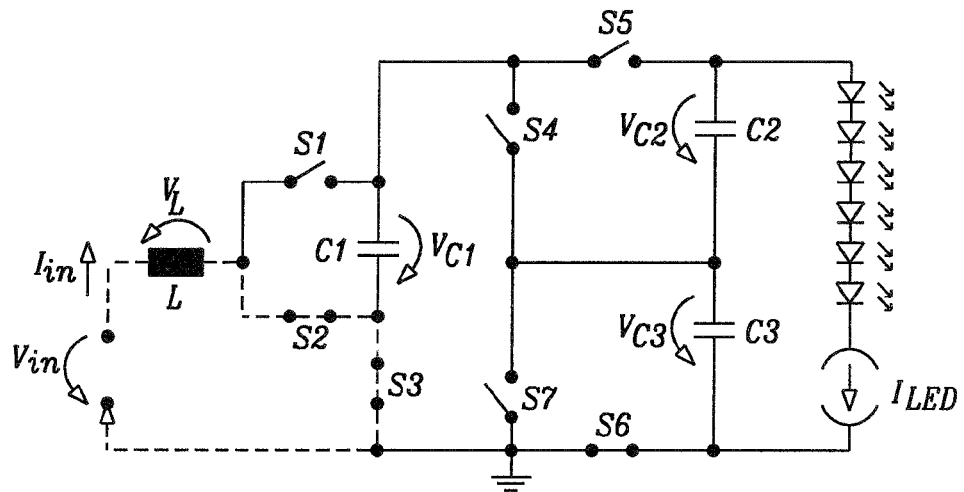
Figure 3D:
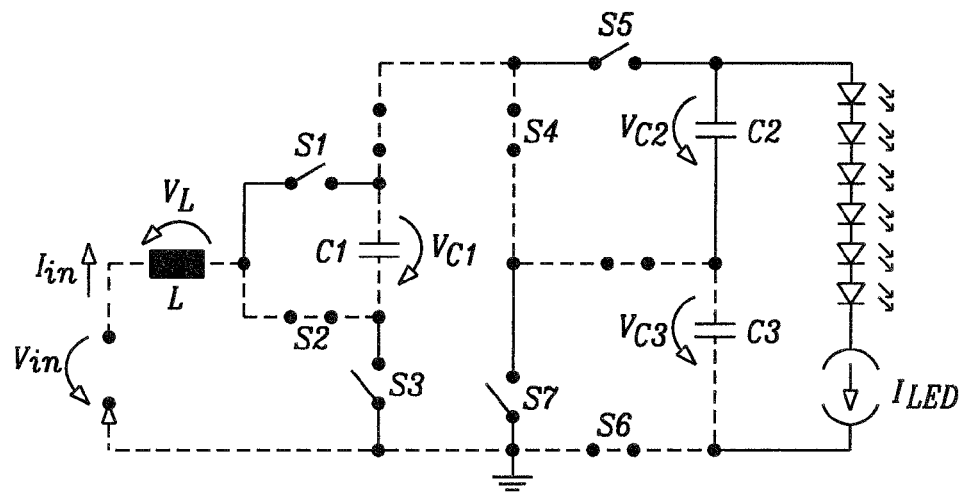
Figure 3E:
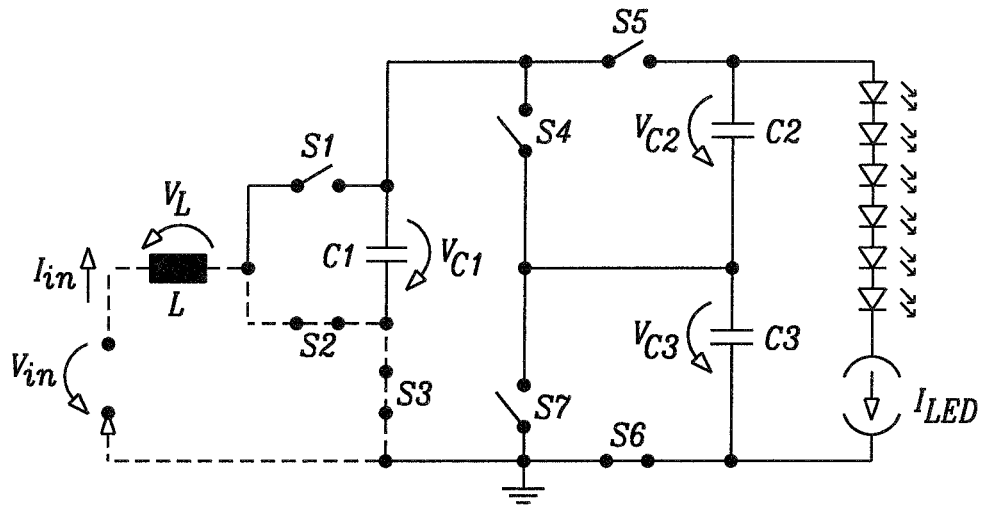
Figure 3F:
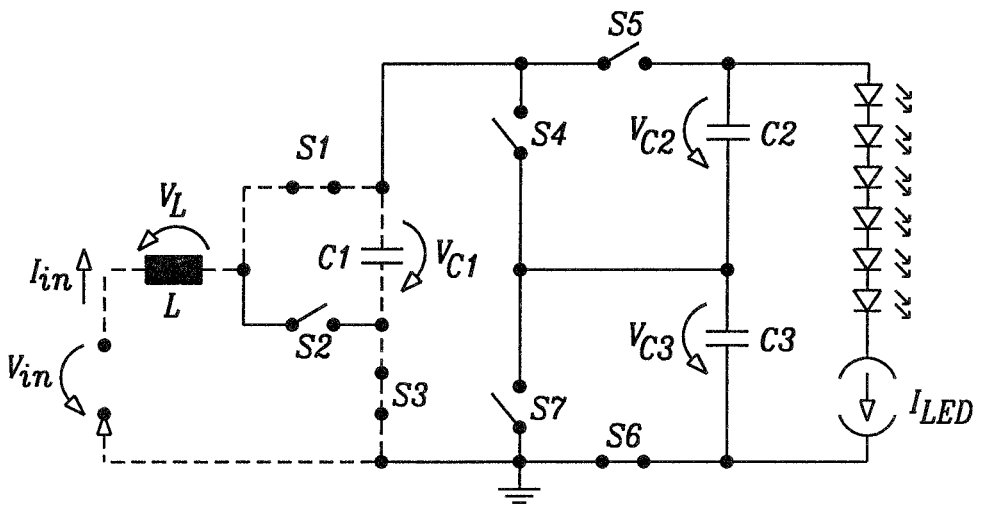
Figure 3G:
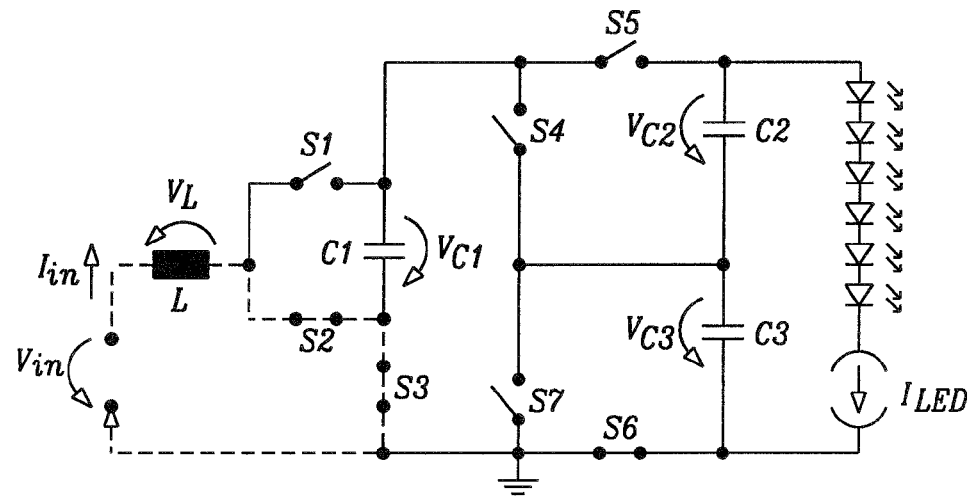

The phases shown in FIGS. 3C and 3G are optional and may be used to reduce inductor current ripple. The phases of FIGS. 3E and 3F are also optional. Hence, the converter may be operated with the four phases shown in FIGS. 3A, 3B, 3D, and 3H.

Figure 3H:
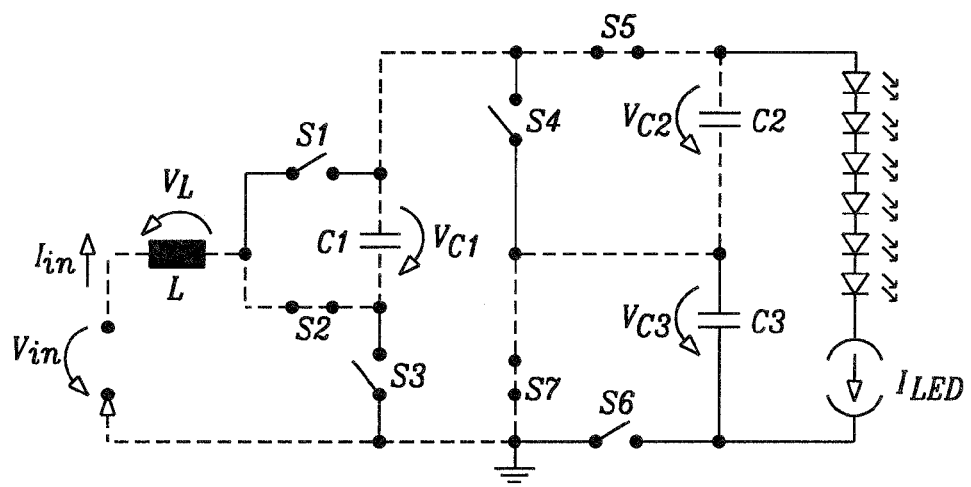

As shown in FIGS. 3A to 3H, the switches S4-S7 toggle only once per cycle, wherein the switches S1-S3 are switching at twice the frequency (when including the phase of FIG. 3F). Only the phases of FIG. 3D and FIG. 3H are providing current into the capacitors C2 or C3. When skipping the phase of FIG. 3F, the value of the capacitor C1 should typically be selected $2x$ the value of capacitor C2. The value of the capacitor C2 is typically equal to the value of the capacitor C3. During all other phases than the phases of FIGS. 3D and 3H the capacitors C2 and C3 are discharged from load or output current, thereby triggering a ripple on the output voltage. The phase of FIGS. 3A (3C, 3E and 3F) ramps the inductor current without affecting the charge of the capacitors and by that regulates the output current/voltage. As such, the phase of FIGS. 3A (3C, 3E and 3F), which is also referred to herein as the first operation phase, may be used for regulation of the output voltage of the power converter.

Figure 3I:
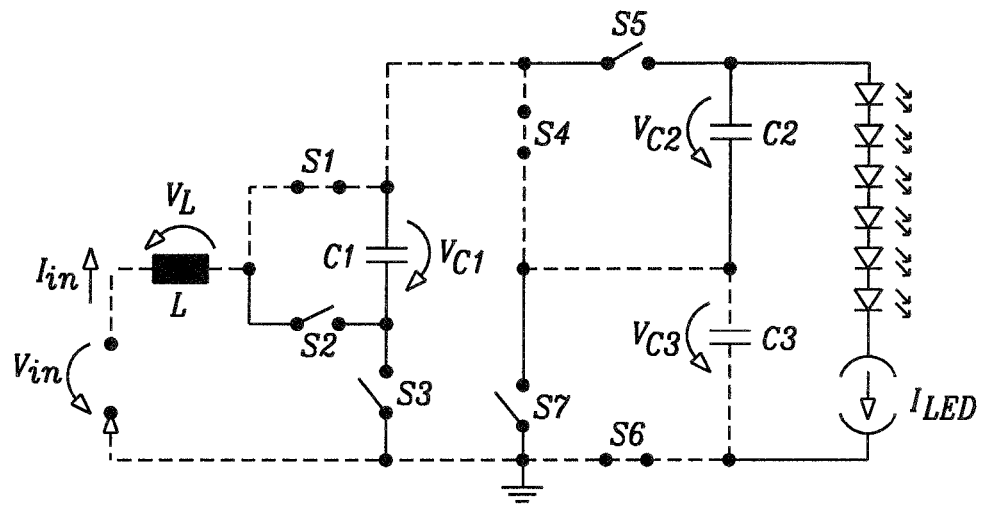
Figure 3J:
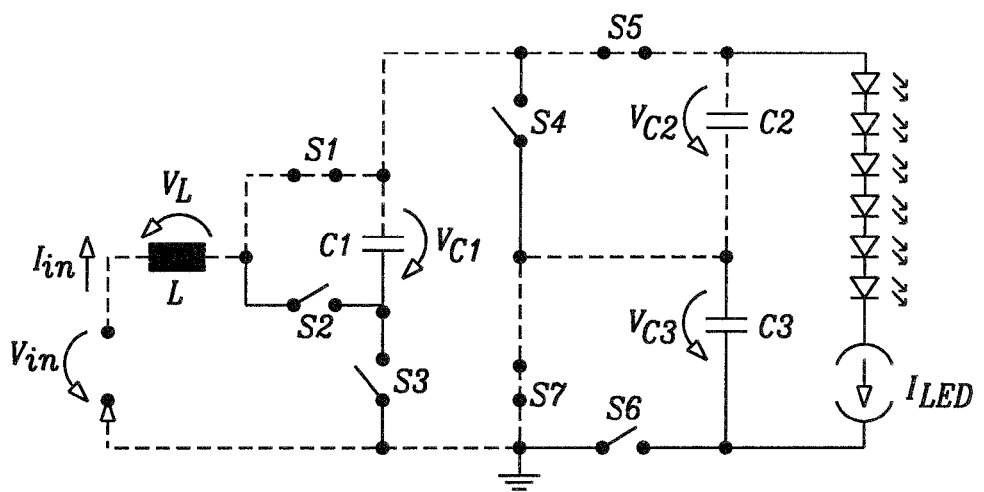
Figure 4A:
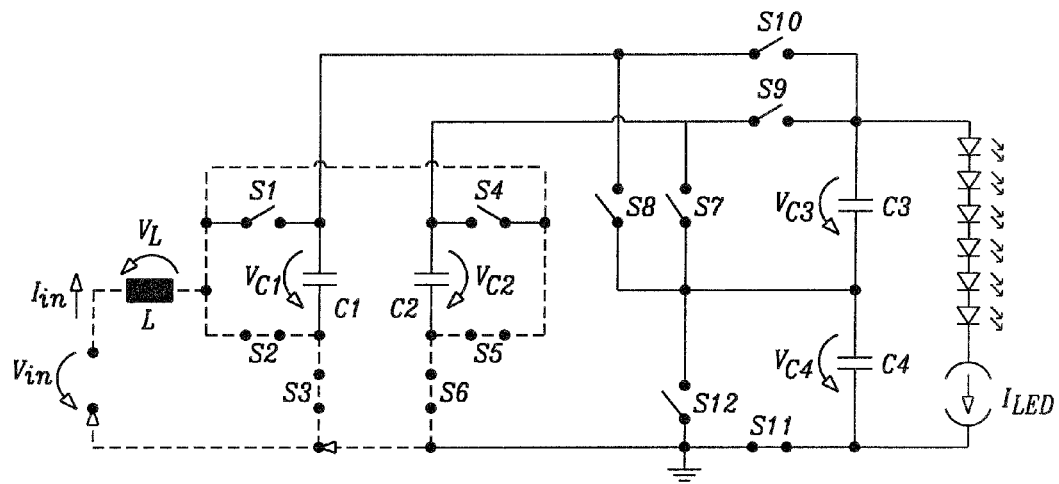
FIGS. 4A to 4H show example operation phases of the power converter of FIG. 1B.
Figure 4B:
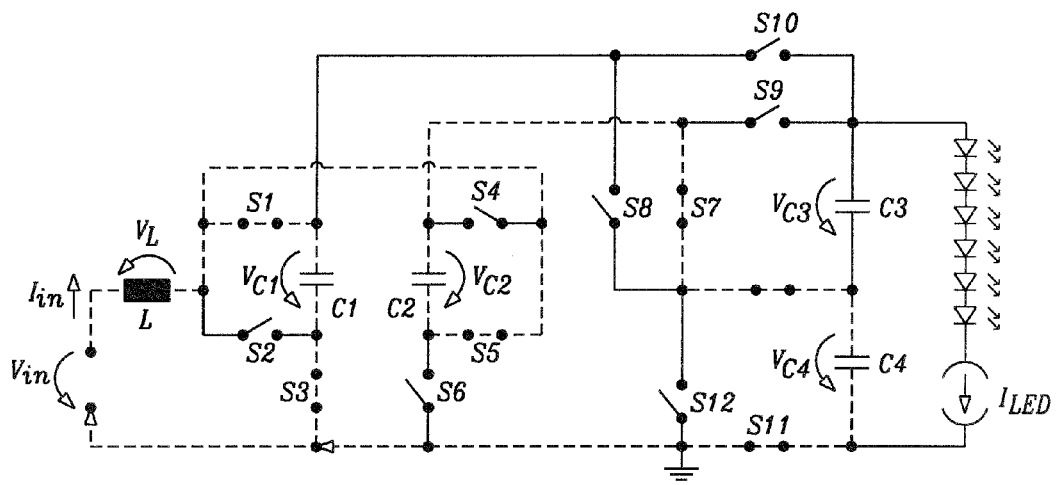
Figure 4C:
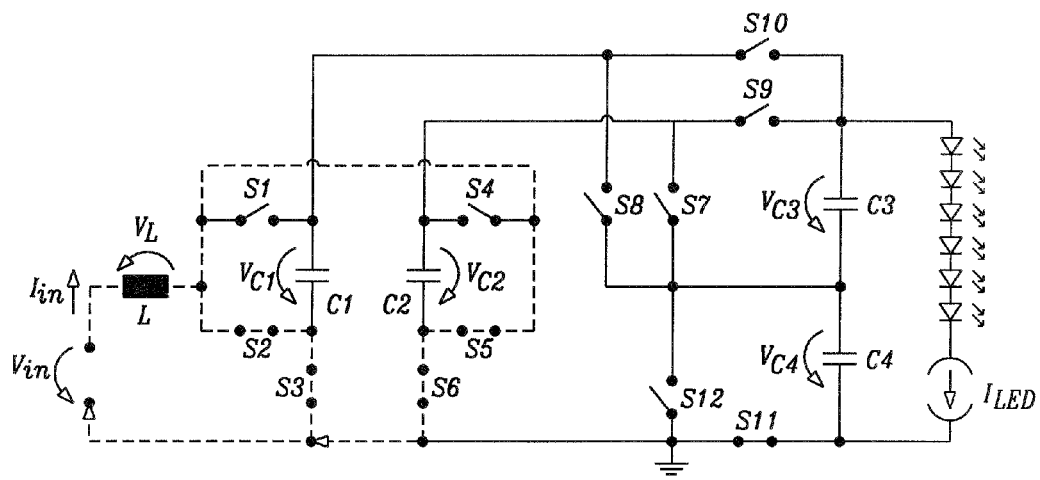
Figure 4D:
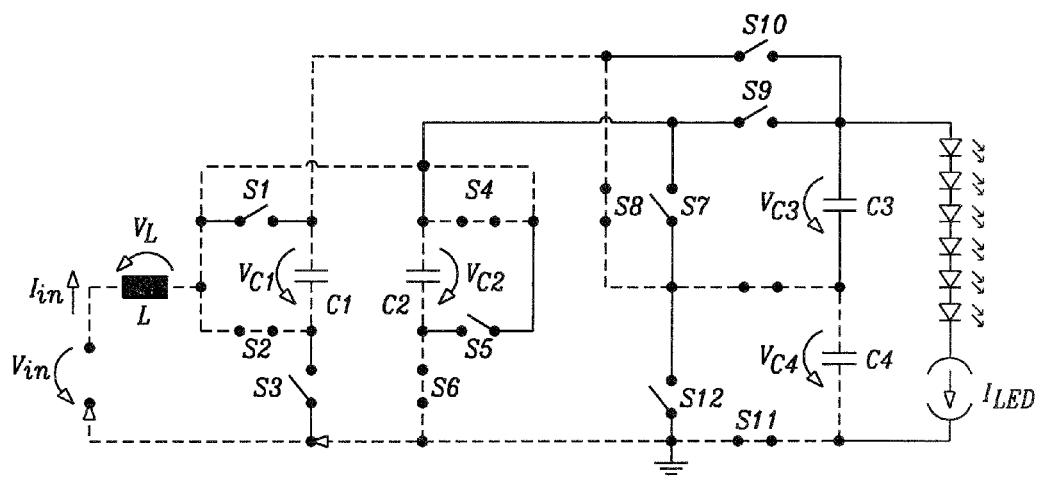
Figure 4E:
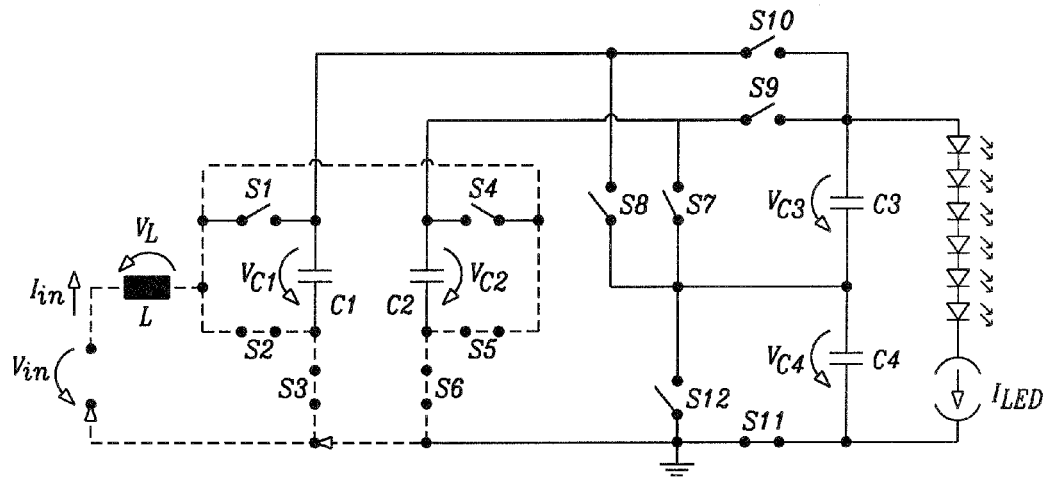
Figure 4F:
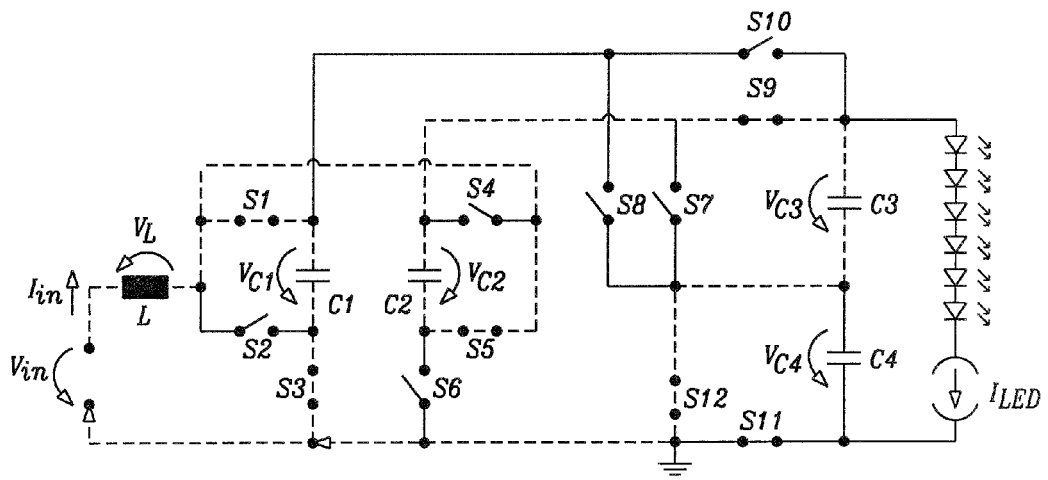
Figure 4G:
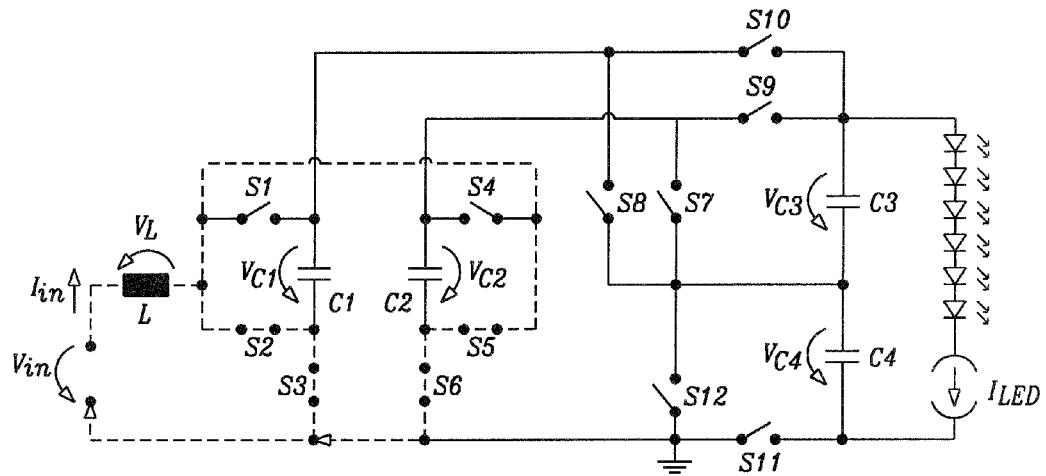
Figure 4H:
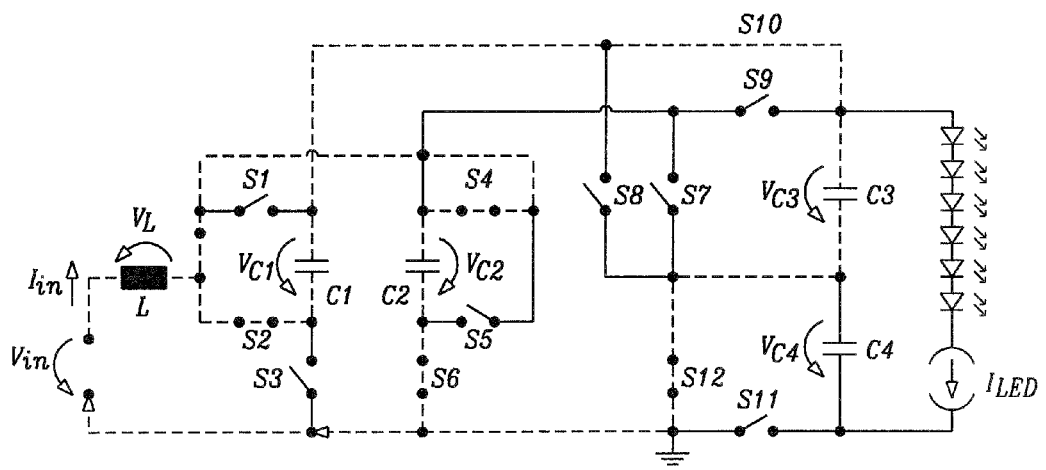

For a conversion ratio less than $D=V_{out}/V_{in}\sim4$ modified operation phases as shown in FIG. 3I and/or FIG. 3J replacing the phases as shown in FIGS. 3A (3C, 3E and 3G) may be used. These operation phases enable an output current/voltage control which is independent from balancing the charge of C1.

For optimum efficiency at $D\sim2$, the switches S4, S6 and S7 of the converter of FIG. 1 may be frozen in an open configuration. When D drops to $\sim1$ (and below) optimum efficiency may be achieved, by controlling the converter to switch like a standard buck converter (toggling between closed switches S1 with S5 and S2 with S3).

The duration of the operation phases of FIGS. 3B, 3D, 3F and 3H may be controlled such that the charge of the capacitors C1 to C3 does not drift over a complete commutation cycle (maintaining typically $V_{C2}=V_{C3}$).

Figure 1B:
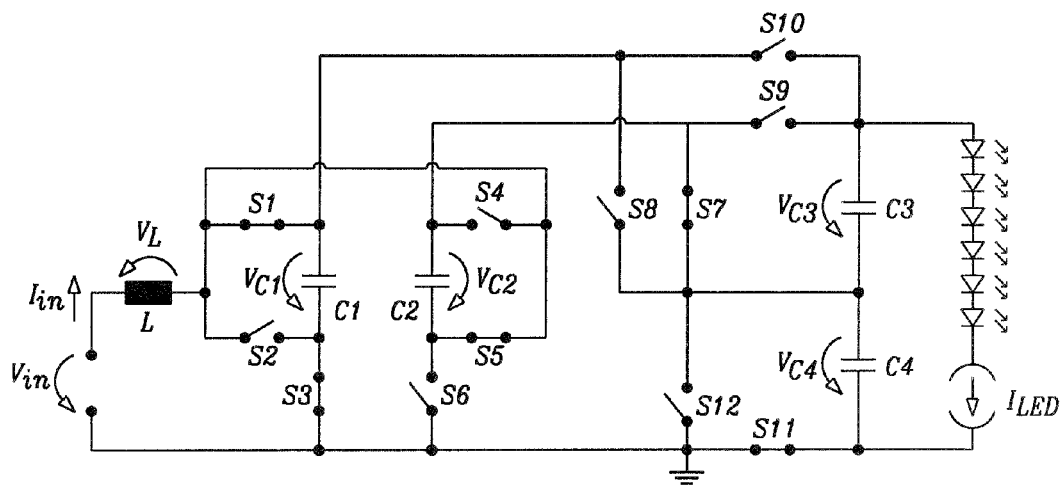

FIG. 1B shows a block diagram of a power converter with further reduced output current/voltage ripple. In the power converter of FIG. 1B, two capacitors C1 and C2 are used in an alternating manner (compared to the capacitor C1 in FIG. 1). As such, the power converter of FIG. 1B comprises two input arrangements, which are operated in an interleaved manner. The capacitors C3 and C4 of FIG. 1B correspond to the capacitors C2 and C3 of FIG. 1. Similar to FIG. 1, the current through the inductor is passing only three serial switches until reaching the capacitors C3/C4, therefore exhibiting relatively low switching losses. Furthermore, similar to the power converter of FIG. 1, the converter of FIG. 1B does not comprise an input capacitor $C_{int}$ and by that does not exhibit any non-adiabatic charge redistribution.

An advantage of the power converter of FIG. 1B compared to the power converter of FIG. 1 is the $2\times$ increased duty cycle of current provision to C3/C4. By doing this, the output current/voltage ripple can be reduced.

FIGS. 4A to 4H show different operation phases, which may be used sequentially within a cycle, for operating the power converter of FIG. 1B. For a conversion ratio $V_{out}/V_{in}$ being in the range of $\sim4$ (or 2 or 1) the operation phases shown in FIGS. 4A (4C, 4E and 4G) may be relatively short, so that the output voltage ripple may be reduced.

The current through the switches (e.g. the FETs) of the power converter of FIG. 1B is halved compared to the current through the switches of FIG. 1. Consequently, the size of the switches may be reduced to 50%. Consequently, the overall size of the power converter may be reduced (compared to the converter of FIG. 1). It should be noted that in a similar manner to the power converter of FIG. 1, several operation phases of the phases of FIGS. 4A to 4H are optional and may be skipped. Typically, a minimum of 3 phases per cycle (e.g. the phases of FIGS. 4A, 4B, 4H) are sufficient. The reduction of the number of phases may be used to increase the duty cycle of output current provision.

Figure 1C:
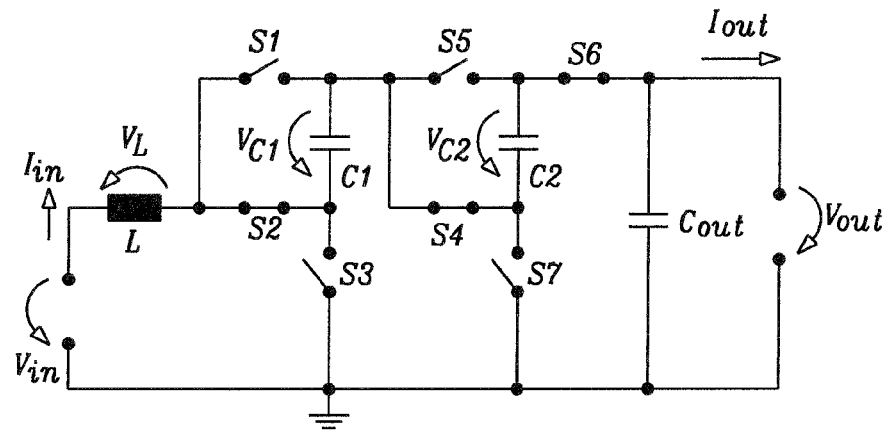

In case a floating ground (GND) of the output voltage $V_{out}$ (caused by the switches S6/S7 in FIG. 1 or by the switches S11/S12 in FIG. 1B) is not desirable, the power converter shown in FIG. 1C may be used. For this purpose, the output arrangement of the output unit of FIG. 1C differs from the output arrangement of the output unit of FIG. 1 or 1B.

The converter of FIG. 1C exhibits a relatively high output voltage ripple. In particular, the converter is such that current is provided to the output capacitor $C_{out}$ only within 1 phase out of 3 to 8 phases, thereby triggering up to $2\times$higher output voltage ripple compared to the power converter of FIG. 1.

Figure 1D:
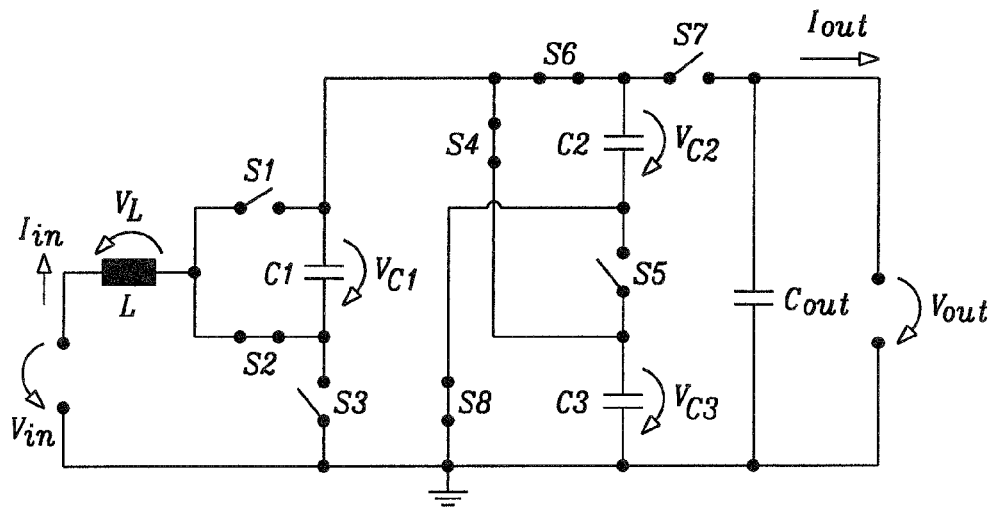
Figure 5A:
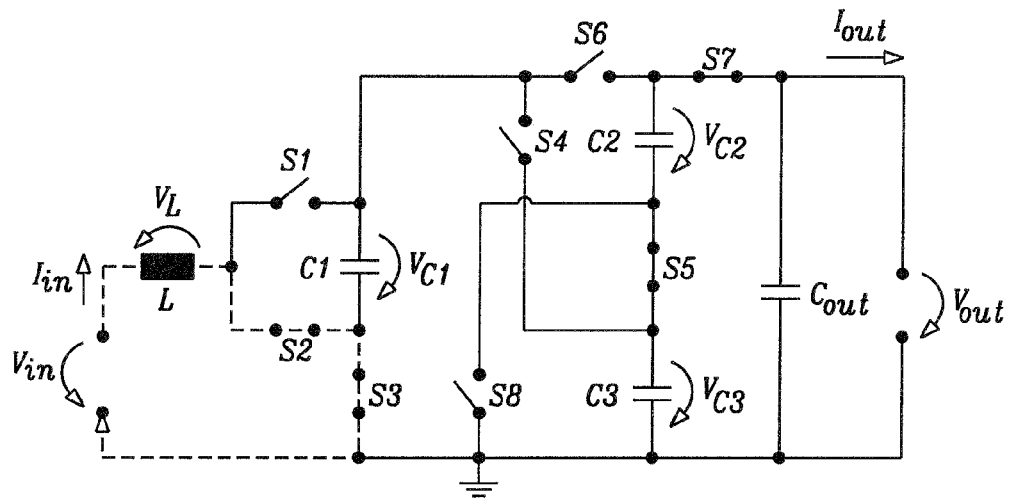
FIGS. 5A to 5D show example operation phases of the power converter of FIG. 1D.
Figure 5B:
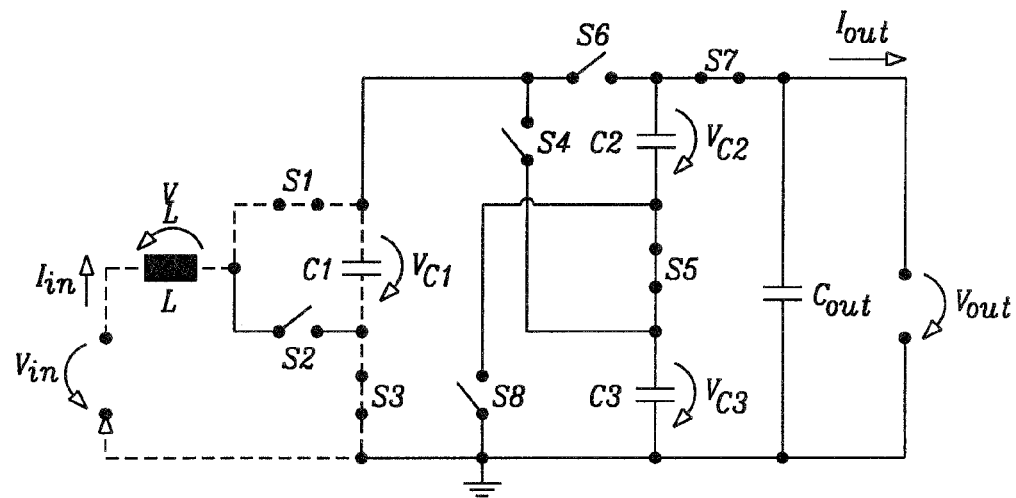
Figure 5C:
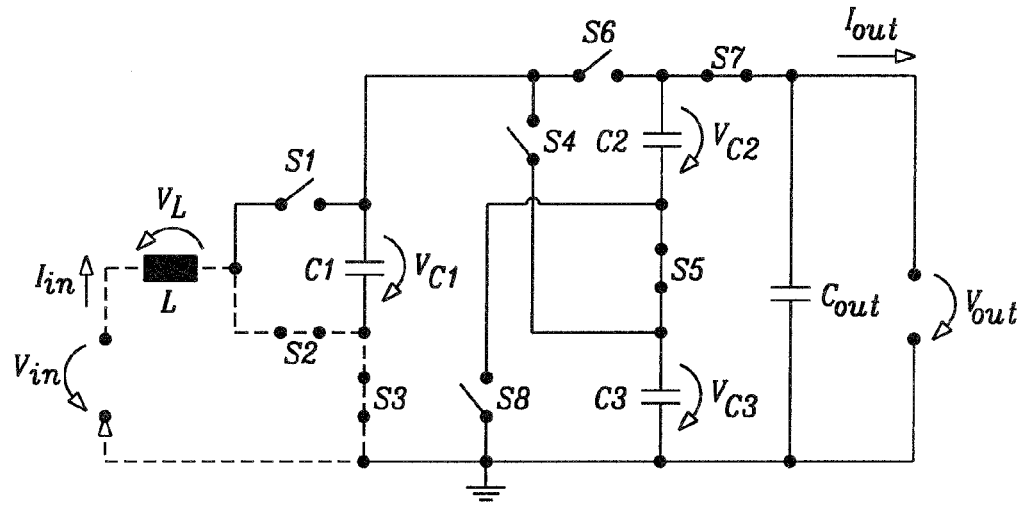
Figure 5D:
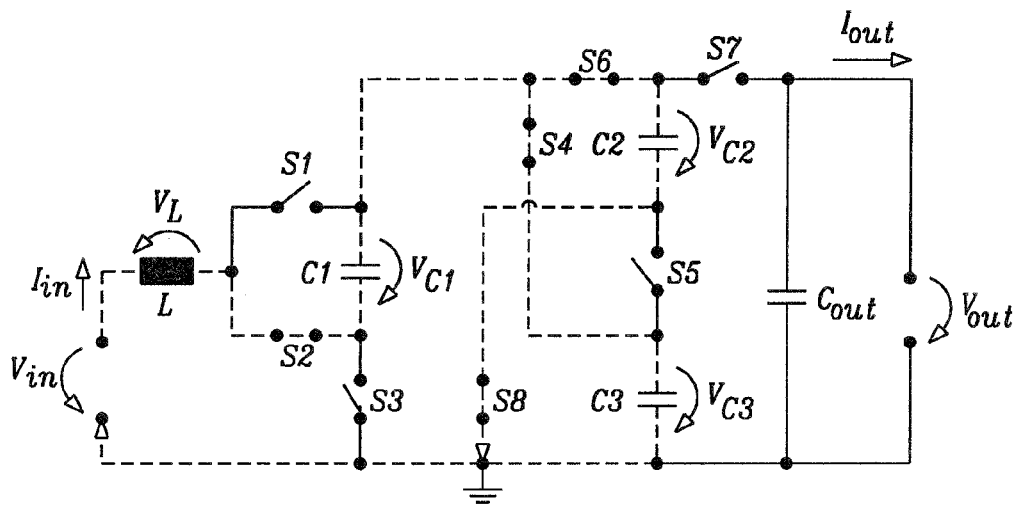
Figure 6A:
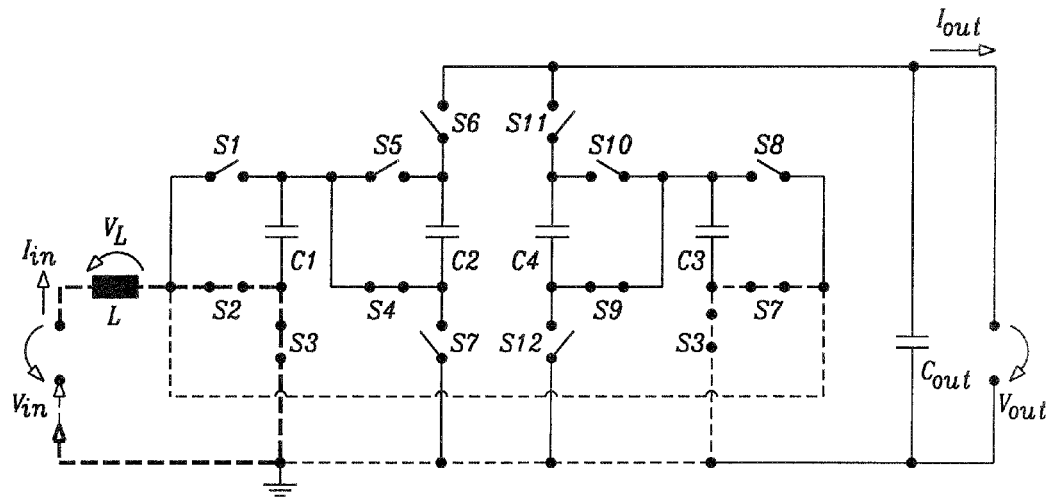
FIGS. 6A to 6L show example operation phases of the power converter of FIG. 1E.
Figure 6B:
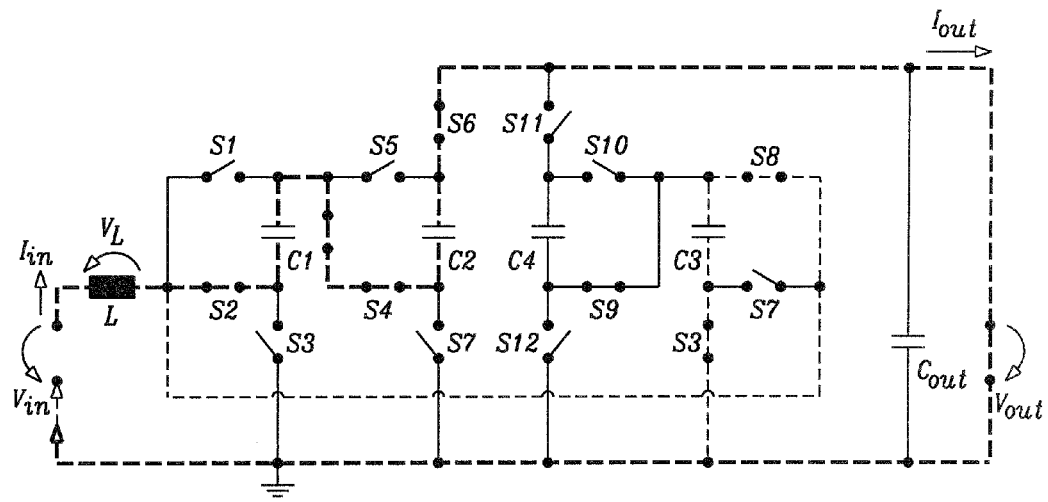
Figure 6C:
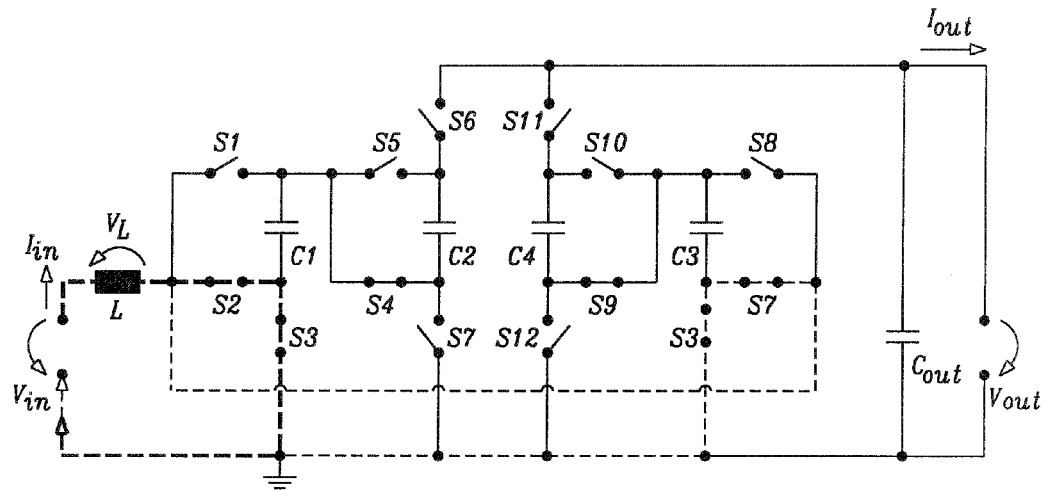
Figure 6D:
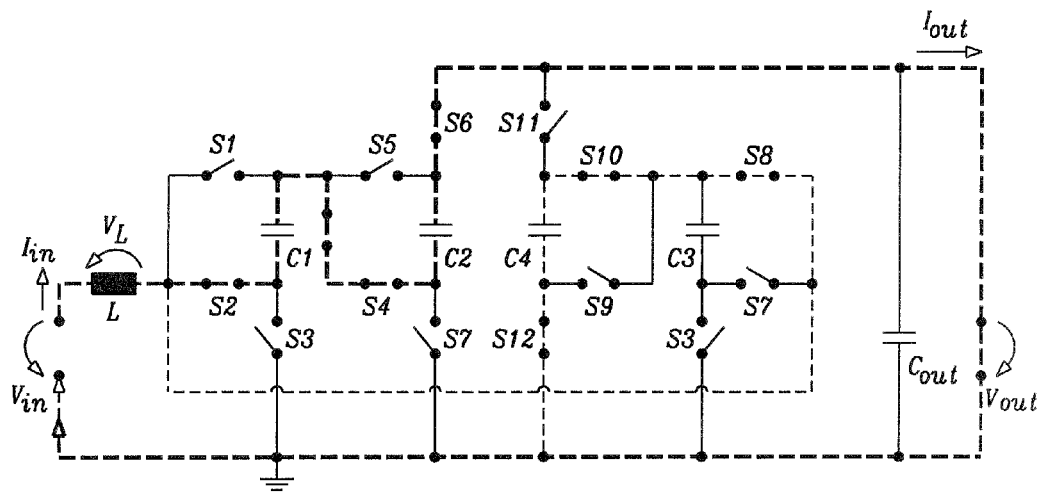
Figure 6E:
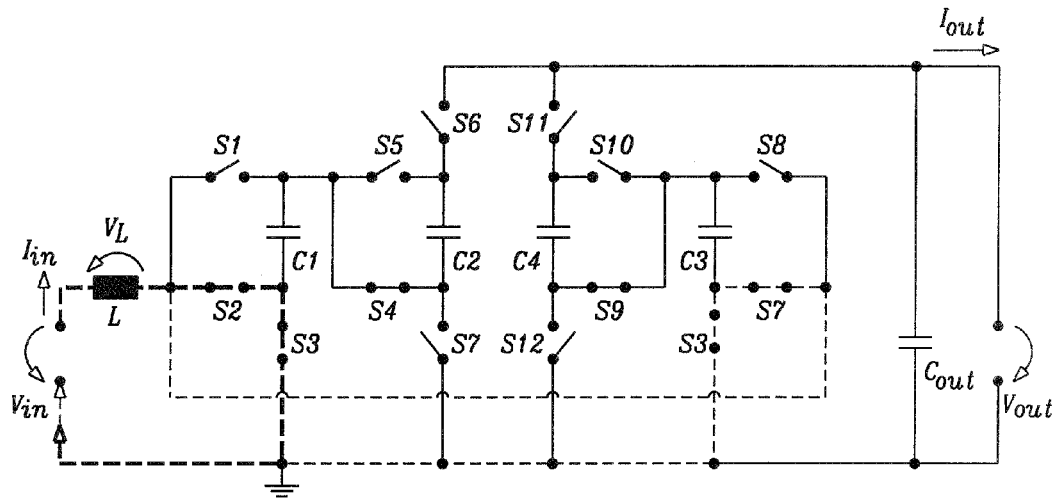
Figure 6F:
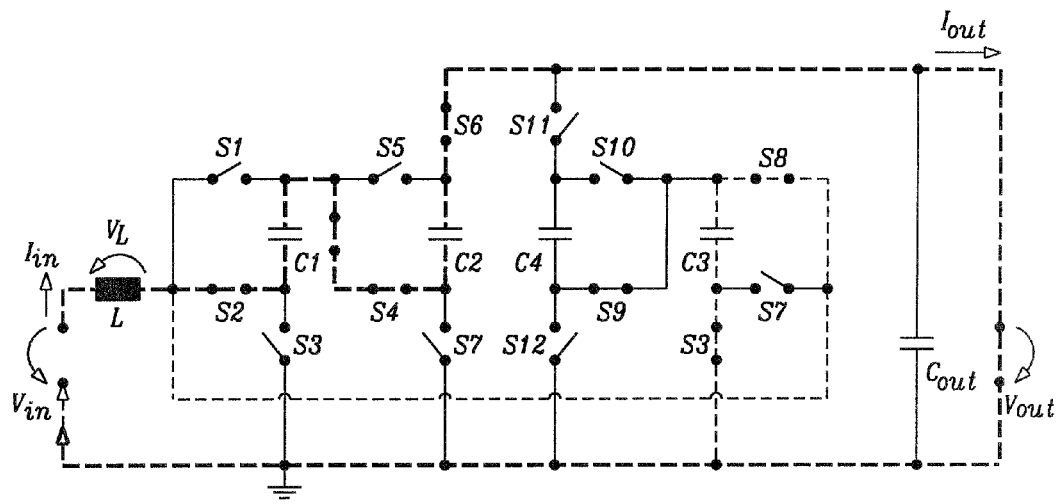
Figure 6G:
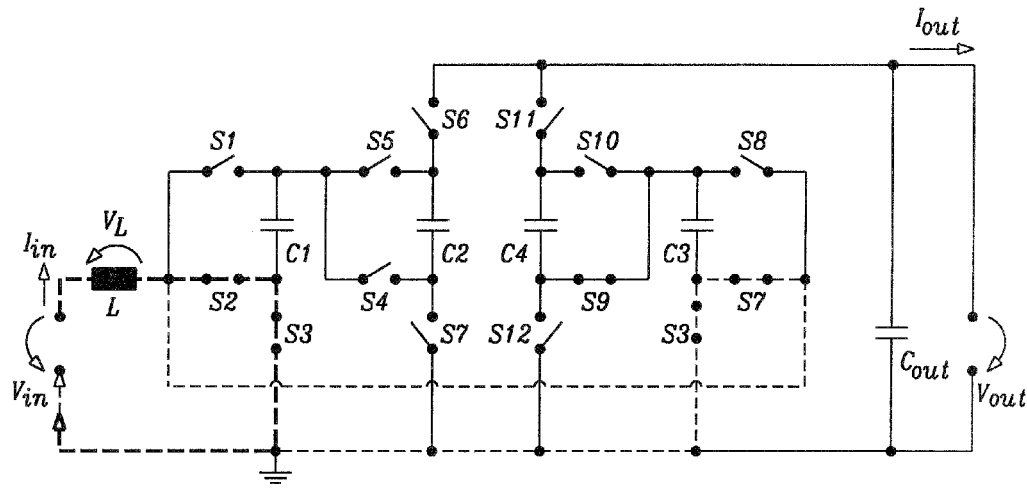
Figure 6H:
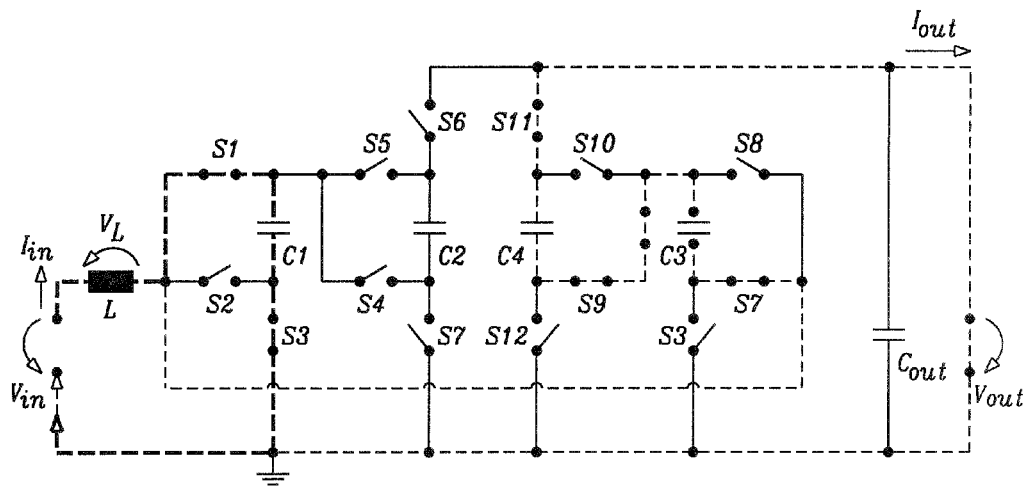
Figure 6I:
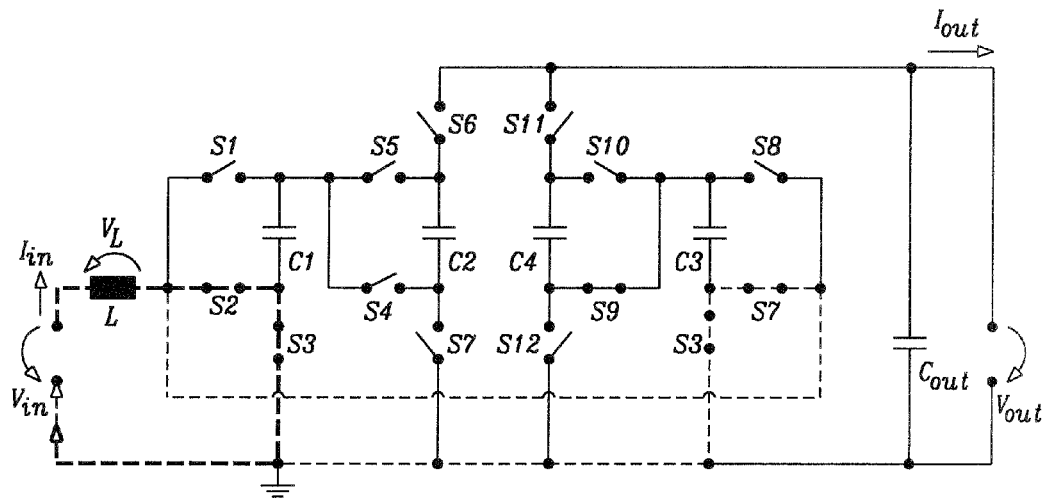
Figure 6J:
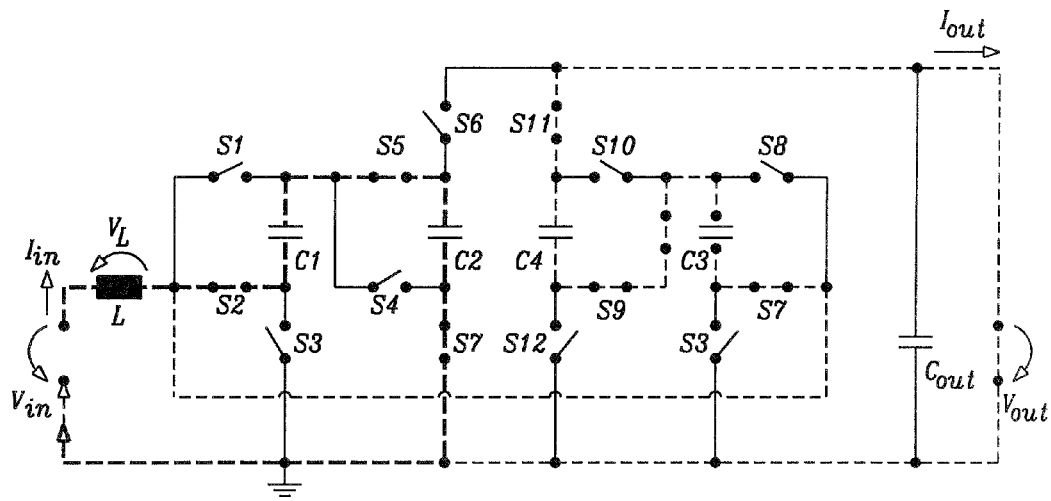
Figure 6K:
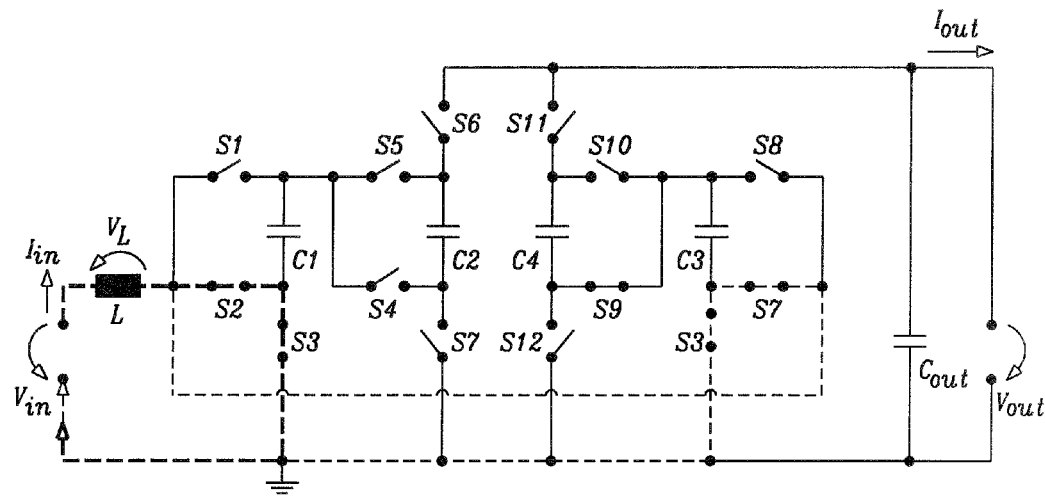
Figure 6L:
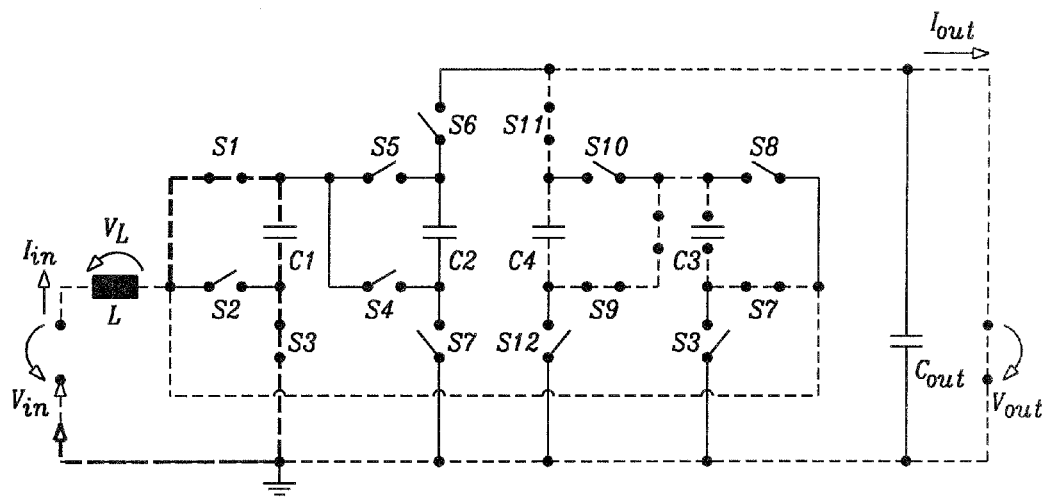

The power converter of FIG. 1D splits the switching capacitance C2 from the power converter of FIG. 1C into a parallel/serial capacitor network. In particular, the switching capacitor C2 is split up into the capacitors C2 and C3. As a result of this, the number of phases, within which no current from the capacitors C2 and/or C3 is provided to the output capacitor $C_{out}$ is reduced to 1 out of 3 to 4 phases. This can be seen in the sequence of operation phases shown in FIGS. 5A to 5D. In particular, it can be seen that only within the phase of FIG. 5D no current is provided to the output capacitor $C_{out}$, while during the phases of FIGS. 5A to 5C current is provided to the output capacitor $C_{out}$. As a result of this, output voltage ripple is reduced.

The power converter of FIG. 1D makes use of one additional capacitor and one more switch (compared to the power converter of FIG. 1C). Furthermore, the power converter of FIG. 1D may exhibit inrush-current from non-adiabatic charge redistribution between the output capacitor Cm and the serial arrangement of the capacitors C2 and C3 (see phases of FIG. 5A to 5C).

Figure 1E:
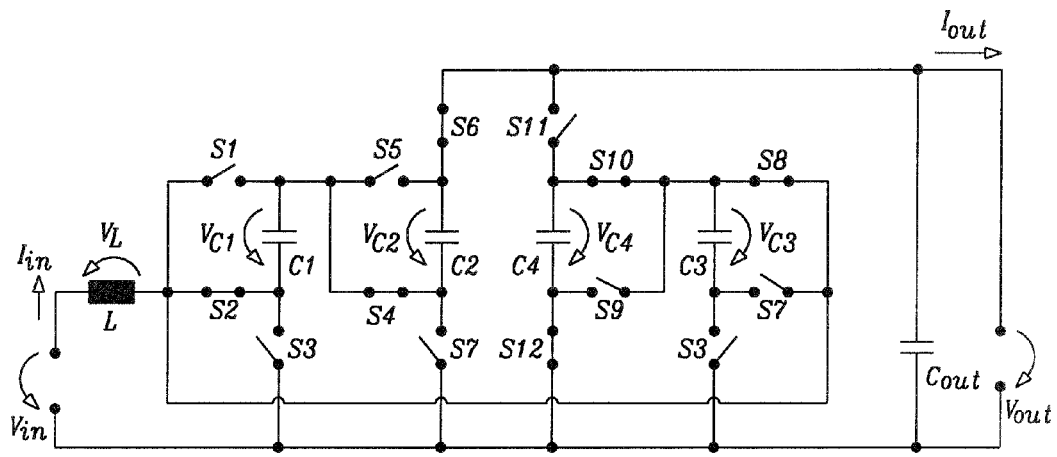

Reduced voltage ripple without non-adiabatic charge redistribution may be implemented by adding a second interleaved switching capacitor network (capacitors C3, C4) to the power converter of FIG. 1C. Such a power converter is shown in FIG. 1E. A sequence of operation phases of the power converter of FIG. 1E is illustrated in FIGS. 6A to 6L.

As shown in FIGS. 6A to 6L, the number of phases per cycle may be up to 12 phases (with a minimum number of 6 phases, when skipping the phases of FIGS. 6C, 6E, 6F, 6G, 6I and 6K). The charging current of the capacitors C1 and C2 (which occurs during the operation phases of FIG. 6G to 6L) depends on the conversion ratio $D=V_{out}/V_{in}$. However, the charging current of the capacitors C1 and C2 is typically greater than 2× the average discharge or output current $I_{out}$ (see the operation phases of FIGS. 6B, 6D and 6F). This applies to the capacitors C3 and C4 in a similar way and should be considered when dimensioning the area of the switches S1 to S12 of the power converter shown in FIG. 1E.

Figure 1F:
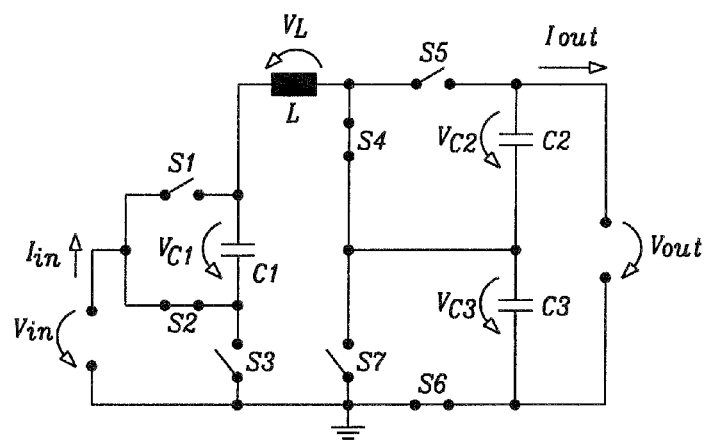

Another example power converter is shown in FIG. 1F. The power converter of FIG. 1F is similar to the power converter of FIG. 1. However, the largest conversion ratio $V_{out}/V_{in}$ with optimum efficiency is reduced to D~3:1 (with optimum efficiency also around 2, 1.5 and 1). This is achieved by positioning the inductor L between the capacitor C1 and the capacitors C2 and C3. The inductor L may be selected for up to 50% reduced peak current rating (compared to the inductor L of the power converter of FIG. 1), thereby reducing the requirements and the costs for the inductor.

Figure 1G:
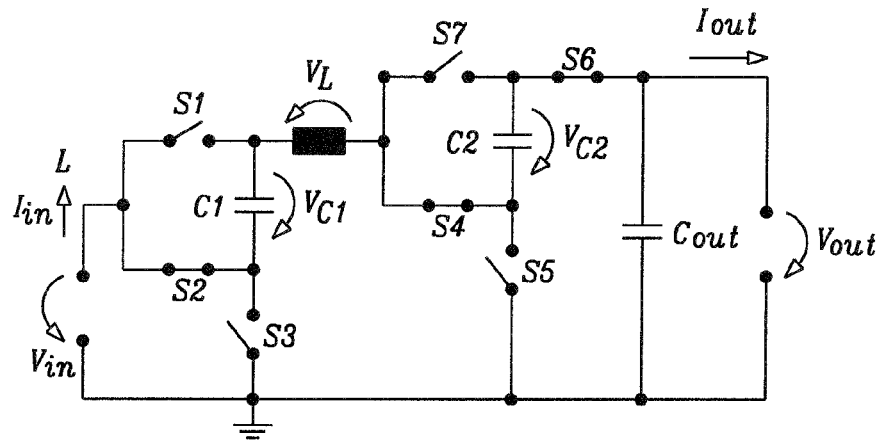

A variant of the power converter of FIG. 1F is shown in FIG. 1G. The power converter of FIG. 1G allows for a fixed ground (GND) connection between the input and the output of the power converter. The power converter of FIG. 1G provides a similar output current ripple as the power converter of FIG. 1C.

The output current ripple of the power converter of FIG. 1G may be reduced by applying additional switches and flying capacitors as described in the context of the power converters of FIG. 1 and FIG. 1B.

Figure 1H:
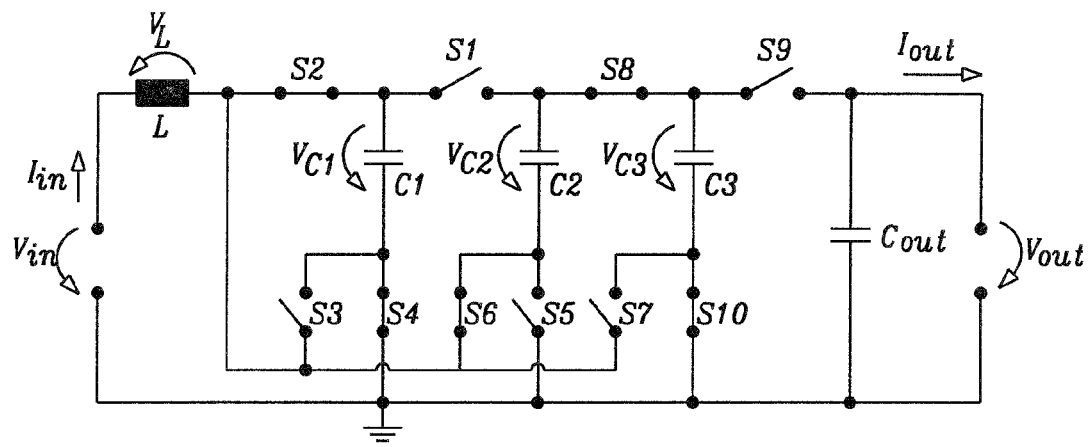

The example power converter shown in FIG. 1H enables an optimum efficiency at a conversion ratio $V_{out}/V_{in}$~4 and 3 (with optimum efficiency also around 2 and 1). The power converter of FIG. 1H does not comprise an input capacitor $C_{in}$ and does not exhibit non-adiabatic charge redistribution.

The power converter of FIG. 1H is operated such that current is provided to the output every $3^{rd}$ or $4^{th}$ phase. As a result of this, the output capacitor $C_{out}$ should be relatively large and/or the switching frequency should be relatively high. Alternatively or in addition, output voltage ripple may be reduced by adding a second interleaved switching capacitor network (similar to the interleaved switching capacitor network described e.g. for the power converters of FIG. 1B and FIG. 1E).

Figure 2:
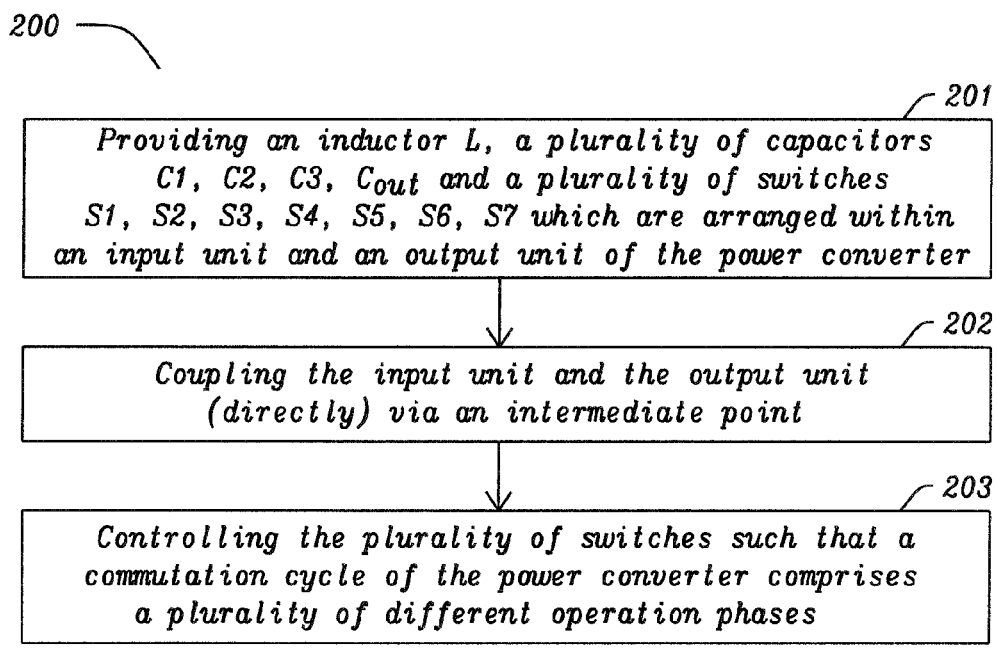
FIG. 2 shows a flow chart of an example method for generating an output voltage from an input voltage.

FIG. 2 shows a flow chart of an example method 200 for deriving electrical power at an output voltage $V_{out}$ at an output of a power converter from electrical power at an input voltage $V_{in}$ at an input of the power converter. The output voltage $V_{out}$ should be greater than or equal to the input voltage $V_{in}$.

The method 200 comprises providing 201 an inductor L, a plurality of capacitors C1, C2, C3, $C_{out}$ and a plurality of switches S1, S2, S3, S4, S5, S6, S7 which are arranged within an input unit and an output unit of the power converter. The output unit comprises (either) a first output arrangement or a second output arrangement. The input unit comprises (either) a first input arrangement or a second input arrangement. The input unit and the output unit are (directly) coupled 202 via an intermediate point. In particular, the input and the output unit may be (directly) coupled to one another via an intermediate point at an intermediate potential and via ground (at ground potential).

Furthermore, the method 200 comprises controlling 203 the plurality of switches such that a commutation cycle of the power converter comprises a plurality of different operation phases. In particular, the plurality of switches may be controlled such that an output current or the output voltage are regulated to a pre-determined reference current and/or reference voltage. By way of example, the reference voltage may be an integer multiple of the input voltage.

The first output arrangement may comprise a second capacitor C2 and a third capacitor C3 which are arranged in series. The serial arrangement of the second capacitor C2 and the third capacitor C3 may be arranged in parallel to a positive contact and a negative contact of the output of the power converter. The first output arrangement is shown e.g. in FIGS. 1, 1B and/or 1F. The first output arrangement further comprises a fifth switch S5 (of the plurality of switches) which is configured to (directly) couple the intermediate point to the positive contact of the output of the power converter. Furthermore, the first output arrangement comprises a fourth switch S4 (of the plurality of switches) which is configured to (directly) couple the intermediate point to a midpoint between the second capacitor and the third capacitor. In addition, the first output arrangement comprises a seventh switch S7 (of the plurality of switches) which is configured to (directly) couple the midpoint between the second capacitor and the third capacitor to ground. The first output arrangement further comprises a sixth switch S6 (of the plurality of switches) which is configured to (directly) couple the negative contact of the output of the power converter to ground. As such, the first output arrangement may provide an output voltage which may exhibit a varying reference potential (different from ground).

The second output arrangement may comprise an output capacitor $C_{out}$ which is arranged in parallel between a positive contact and a negative contact of the output of the power converter. Furthermore, the second output arrangement may comprise a second capacitor C2. The second output arrangement is shown e.g. in FIGS. 1C, 1D, 1E, 1G and/or 1H. The second output arrangement comprises a sixth switch S6 (of the plurality of switches) which is configured to (directly) couple a positive contact of the output of the power converter to a first end of the second capacitor C2.

Furthermore, the second output arrangement comprises a seventh switch S7 (of the plurality of switches) which is configured to (directly) couple a second end of the second capacitor C2 to ground. Within the second output arrangement a negative contact of the output of the power converter may be (constantly) coupled to ground. As such, the first output arrangement may provide an output voltage which exhibits a fixed reference potential (i.e. ground).

The second output arrangement further comprises a fifth switch S5 (of the plurality of switches) which is configured to (directly) couple the intermediate point to the first end of the second capacitor. Furthermore, the second output arrangement comprises a fourth switch S4 which is configured to (directly) couple the intermediate point to the second end of the second capacitor.

On the other hand, the first input arrangement may comprise a first capacitor C1 and the inductor L. The first input arrangement is shown e.g. in FIGS. 1, 1B, 1C, 1D, 1E and/or 1H. In addition, the first input arrangement comprises a first switch S1 (of the plurality of switches) which is configured to (directly) couple a second end of the inductor to the intermediate point. A first end of the inductor is (directly) coupled to a positive contact of the input of the power converter and a first end of the first capacitor is (directly) coupled to the intermediate point. By placing the inductor directly at the input of the power converter, the conversion ratio of the power converter may be increased (e.g. maximized).

The first input arrangement further comprises a second switch S2 (of the plurality of switches) which is configured to (directly) couple the second end of the inductor to the second end of the first capacitor. Furthermore, the first input arrangement comprises a third switch S3 (of the plurality of switches) which is configured to (directly) couple a second end of the first capacitor to ground. A negative contact of the input of the power converter may be (directly) coupled to ground.

The second input arrangement may comprise a first capacitor C1 and the inductor L. The second input arrangement is shown e.g. in FIGS. 1F and/or 1G. The second input arrangement further comprises a first switch S1 (of the plurality of switches) which is configured to (directly) couple a first end of the inductor to a positive contact of the input of the power converter. A second end of the inductor is (directly) coupled to the intermediate point, and a first end of the first capacitor is (directly) coupled to a first end of the inductor. As such, the inductor may be arranged between the first capacitor and the intermediate point. By doing this, reduced conversion ratios may be provided. Furthermore, the second input arrangement comprises a second switch S2 (of the plurality of switches) which is configured to (directly) couple the second end of the first capacitor to the positive contact of the input of the power converter. In addition, the second input arrangement comprises a third switch S3 (of the plurality of switches) which is configured to (directly) couple a second end of the first capacitor to ground. A negative contact of the input of the power converter may be (directly) coupled to ground.

As such, the use of low operation frequency switching Multi-Level Boost Converters as high-efficient voltage step-up converters is described, notably in the context of LCD backlight drivers for serial LED strings. The BOM of such converters may be reduced and/or the size of output capacitors (for reduced output voltage ripple) may be reduced using the described topologies of switched capacitive multiplier circuitry combined with a Multi-Level Switching Cell.

In particular the present document describes the use of low frequency Multi-Level Boost Converters in combination with low inductance coils, notably for LED backlight step-up conversion. The described power converters comprise a relatively low number of switching capacitors to provide a low frequency switching Multi-Level Boost Converter with a relatively high $V_{out}/V_{in}$ conversion ratio in combination with a small single inductor and/or low output capacitance.

The use of multi-level switching cells for the step-up conversion of backlight boost regulators enables reduced inductor ripple and by that low switching or operation frequencies in combination with low inductance (i.e. small sized coils). The low switching frequency and the reduced DCR (from low inductance) increase conversion efficiency (i.e. reduce dissipation power). Using an optimized arrangement of switching cells, the number of switching capacitors may be reduced (as shown e.g. in the context of FIGS. 1, 1C, 1D, 1F and/or 1G). Furthermore, output current ripple and by that the amount of the capacitance (C3 & C4 or $C_{out}$) may be reduced (e.g. using the power converters of FIGS. 1B, 1D and/or 1E).

It should be noted that the description and drawings merely illustrate the principles of the proposed methods and systems. Those skilled in the art will be able to implement various arrangements that, although not explicitly described or shown herein, embody the principles of the invention and are included within its spirit and scope.

Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A voltage or current regulated power converter, wherein
the power converter is configured to derive electrical power at an output voltage $V_{out}$ at an output of the power converter from electrical power at an input voltage $V_{in}$ at an input of the power converter;
the output voltage $V_{out}$ is greater than or equal to the input voltage $V_{in}$;
the power converter comprises an inductor (L), a plurality of capacitors (C1, C2, C3, $C_{out}$) and a plurality of switches (S1, S2, S3, S4, S5, S6, S7), which are arranged within an input unit and an output unit of the power converter;
the input unit and the output unit are coupled via an intermediate point;
the output unit comprises a first output arrangement;
the input unit comprises a first input arrangement;
the power converter comprises a controller configured to control the plurality of switches such that a commutation cycle of the power converter comprises a plurality of different operation phases;
the first output arrangement comprises
a second capacitor (C2) and a third capacitor (C3) which are arranged in series, wherein the serial arrangement of the second and third capacitor are arranged in parallel to a positive and a negative contact of the output of the power converter;
a fifth switch (S5) configured to couple the intermediate point to the positive contact of the output;

a fourth switch (S4) configured to couple the intermediate point to a midpoint between the second capacitor and the third capacitor;
a seventh switch (S7) configured to couple the midpoint to ground; and
a sixth switch (S6) configured to couple the negative contact of the output to ground; and
the first input arrangement comprises
a first capacitor (C1) and the inductor (L);
a first switch (S1) configured to couple a second end of the inductor to the intermediate point; wherein a first end of the inductor is coupled to a positive contact of the input of the power converter; wherein a first end of the first capacitor is coupled to the intermediate point;
a second switch (S2) configured to couple the second end of the inductor to the second end of the first capacitor; and
a third switch (S3) configured to couple a second end of the first capacitor to ground; wherein a negative contact of the input of the power converter is coupled to ground.

2. The power converter of claim 1, wherein the plurality of operation phases comprise
a first phase during which the inductor is arranged in parallel between the positive contact and the negative contact of the input; and
a second phase during which a serial arrangement of the inductor and the first capacitor is arranged in parallel between the positive contact and the negative contact of the Input.

3. The power converter of claim 1, wherein the plurality of operation phases comprise a third phase during which one or more capacitors of the output unit are arranged in parallel to a serial arrangement of the inductor and the first capacitor.

4. The power converter of claim 3, wherein during the second phase the first capacitor has an orientation with respect to the inductor which is reversed compared to an orientation during the third phase.

5. The power converter of claim 1, wherein the plurality of operation phases comprise a fourth phase during which
the one or more capacitors of the output unit are arranged in series with the inductor; and
the first capacitor is decoupled from the input and the output of the power converter.

6. The power converter of claim 1, wherein the plurality of operation phases is such that prior to an operation phase during which the inductor is coupled to the output unit, the power converter is operated in an operation phase during which the inductor is magnetized or de-magnetized, depending on the ratio of the output voltage Vout to the input voltage Vin.

7. The power converter of claim 1, wherein the plurality of operation phases is such that prior to an operation phase during which the inductor is arranged in series to the first capacitor, the power converter is operated in an operation phase during which the inductor is magnetized or de-magnetized, depending on the ratio of the output voltage Vout to the input voltage Vin.

8. The power converter of claim 1, wherein
the input unit comprises a plurality of first input arrangements or a plurality of second input arrangements; and
the controller is configured to operate the plurality of first and/or second input arrangements in an interleaved manner.

9. The power converter of claim 1, wherein
the input unit comprises a plurality of first input arrangements or a plurality of second input arrangements; and
the plurality of first input arrangements and/or the plurality of second input arrangements each comprise a joint single inductor.

10. The power converter of claim 1, wherein
the output unit comprises the second output arrangement;
the second output arrangement comprises a third capacitor and an eighth switch;
the eighth switch is configured to couple a first end of the third capacitor to the second end of the second capacitor;
a second end of the third capacitor is coupled to ground; and
the controller is configured to operate the power converter in
a phase during which the second capacitor and the third capacitor are arranged in series, and parallel to the output capacitor; and
a phase during which the second capacitor and the third capacitor are arranged in parallel to one another and each in series to a serial arrangement of the inductor and the first capacitor.

11. The power converter of claim 1, wherein
the input unit comprises a plurality of second input arrangements;
the output unit comprises a plurality of second output arrangements;
the controller is configured to operate the plurality of second input arrangements and/or the plurality of second output arrangements in an interleaved manner.

12. The power converter of claim 1, wherein a switch comprises a metaloxide semiconductor transistor.

13. The power converter of claim 1, wherein the controller is configured to set the duration of each of the plurality of operation phases such that the output voltage is regulated to a pre-determined reference voltage; wherein the pre-determined reference voltage is an integer multiple of the input voltage.

14. The power converter of claim 1, wherein the output of the power converter is coupled to a serial arrangement of a plurality of solid state lighting, referred to as SSL, devices.

15. A voltage or current regulated power converter, wherein
the power converter is configured to derive electrical power at an output voltage $V_{out}$ at an output of the power converter from electrical power at an input voltage $V_{in}$ at an input of the power converter;
the output voltage $V_{out}$ is greater than or equal to the input voltage $V_{in}$;
the power converter comprises an inductor (L), a plurality of capacitors (C1, C2, C3, $C_{out}$) and a plurality of switches (S1, S2, S3, S4, S5, S6, S7), which are arranged within an input unit and an output unit of the power converter;
the input unit and the output unit are coupled via an intermediate point;
the output unit comprises a second output arrangement;
the input unit comprises a first input arrangement;
the power converter comprises a controller configured to control the plurality of switches such that a commutation cycle of the power converter comprises a plurality of different operation phases;

the second output arrangement comprises
an output capacitor ($C_{out}$) which is arranged in parallel between a positive contact and a negative contact of the output of the power converter;
a second capacitor (C2);
a sixth switch (S6) configured to couple a positive contact of the output of the power converter to a first end of the second capacitor;
a seventh switch (S7) configured to couple a second end of the second capacitor to ground; wherein a negative contact of the output of the power converter is coupled to ground;
a fifth switch (S5) configured to couple the intermediate point to the first end of the second capacitor; and
a fourth switch (S4) configured to couple the intermediate point to the second end of the second capacitor; and the first input arrangement comprises
a first capacitor (C1) and the inductor (L);
a first switch (S1) configured to couple a second end of the inductor to the intermediate point; wherein a first end of the inductor is coupled to a positive contact of the input of the power converter, wherein a first end of the first capacitor is coupled to the intermediate point;
a second switch (S2) configured to couple the second end of the inductor to the second end of the first capacitor; and
a third switch (S3) configured to couple a second end of the first capacitor to ground; wherein a negative contact of the input of the power converter is coupled to ground.

16. A voltage or current regulated power converter, wherein
the power converter is configured to derive electrical power at an output voltage $V_{out}$ at an output of the power converter from electrical power at an input voltage $V_{in}$ at an input of the power converter;
the output voltage $V_{out}$ is greater than or equal to the input voltage $V_{in}$;
the power converter comprises an inductor (L), a plurality of capacitors (C1, C2, C3, $C_{out}$) and a plurality of switches (S1, S2, S3, S4, S5, S6, S7), which are arranged within an input unit and an output unit of the power converter;
the input unit and the output unit are coupled via an intermediate point;
the output unit comprises a first output arrangement;
the input unit comprises a second input arrangement;
the power converter comprises a controller configured to control the plurality of switches such that a commutation cycle of the power converter comprises a plurality of different operation phases;
the first output arrangement comprises
a second capacitor (C2) and a third capacitor (C3) which are arranged in series, wherein the serial arrangement of the second and third capacitor are arranged in parallel to a positive and a negative contact of the output of the power converter;
a fifth switch (S5) configured to couple the intermediate point to the positive contact of the output;
a fourth switch (S4) configured to couple the intermediate point to a midpoint between the second capacitor and the third capacitor;
a seventh switch (S7) configured to couple the midpoint to ground; and a sixth switch (S6) configured to couple the negative contact of the output to ground; and
the second input arrangement comprises
a first capacitor (C1) and the inductor (L);
a first switch (S1) configured to couple a first end of the inductor to a positive contact of the input of the power converter; wherein a second end of the inductor is coupled to the intermediate point; wherein a first end of the first capacitor is coupled to a first end of the inductor;
a second switch (S2) configured to couple the second end of the first capacitor to the positive contact of the input of the power converter; and
a third switch (S3) configured to couple a second end of the first capacitor to ground; wherein a negative contact of the input of the power converter is coupled to ground.

17. A voltage or current regulated power converter, wherein
the power converter is configured to derive electrical power at an output voltage $V_{out}$ at an output of the power converter from electrical power at an input voltage $V_{in}$ at an input of the power converter;
the output voltage $V_{out}$ is greater than or equal to the input voltage $V_{in}$;
the power converter comprises an inductor (L), a plurality of capacitors (C1, C2, C3, $C_{out}$) and a plurality of switches (S1, S2, S3, S4, S5, S6, S7), which are arranged within an input unit and an output unit of the power converter;
the input unit and the output unit are coupled via an intermediate point;
the output unit comprises a second output arrangement;
the input unit comprises a second input arrangement;
the power converter comprises a controller configured to control the plurality of switches such that a commutation cycle of the power converter comprises a plurality of different operation phases;
the second output arrangement comprises
an output capacitor ($C_{out}$) which is arranged in parallel between a positive contact and a negative contact of the output of the power converter;
a second capacitor (C2);
a sixth switch (S6) configured to couple a positive contact of the output of the power converter to a first end of the second capacitor;
a seventh switch (S7) configured to couple a second end of the second capacitor to ground; wherein a negative contact of the output of the power converter is coupled to ground;
a fifth switch (S5) configured to couple the intermediate point to the first end of the second capacitor; and
a fourth switch (S4) configured to couple the intermediate point to the second end of the second capacitor; and
the second input arrangement comprises
a first capacitor (C1) and the inductor (L);
a first switch (S1) configured to couple a first end of the inductor to a positive contact of the input of the power converter; wherein a second end of the inductor is coupled to the intermediate point; wherein a first end of the first capacitor is coupled to a first end of the inductor;
a second switch (S2) configured to couple the second end of the first capacitor to the positive contact of the input of the power converter; and a third switch (S3) configured to couple a second end of the first capacitor to ground; wherein a negative contact of the input of the power converter is coupled to ground.

* * * * *